(12) United States Patent
Guzelgoz et al.

(10) Patent No.: US 11,750,422 B2
(45) Date of Patent: *Sep. 5, 2023

(54) METHODS AND APPARATUS FOR DECODING RECEIVED UPLINK TRANSMISSIONS

(71) Applicant: Marvell Asia Pte, Ltd., Singapore (SG)

(72) Inventors: Sabih Guzelgoz, San Jose, CA (US); Hong Jik Kim, San Jose, CA (US); Nagabhushana Rao Kurapati, Fremont, CA (US); Xing Qian, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,480

(22) Filed: Nov. 19, 2021

(65) Prior Publication Data

US 2022/0078053 A1 Mar. 10, 2022

Related U.S. Application Data

(63) Continuation of application No. 16/457,863, filed on Jun. 28, 2019, now Pat. No. 11,212,144.

(Continued)

(51) Int. Cl.
*H04L 25/03* (2006.01)
*H04L 5/00* (2006.01)
(Continued)

(52) U.S. Cl.
CPC ...... *H04L 25/03286* (2013.01); *H04L 1/0026* (2013.01); *H04L 5/0053* (2013.01); *H04W 72/21* (2023.01)

(58) Field of Classification Search
CPC ............ H04L 25/03286; H04L 1/0026; H04L 5/0053; H04L 5/0057; H04L 5/0094;
(Continued)

(56) References Cited

U.S. PATENT DOCUMENTS

| 2007/0019752 A1* | 1/2007 | Kim | ...................... H04L 25/067 |
| | | | 375/340 |
| 2015/0082132 A1* | 3/2015 | Jeong | ................ H03M 13/6362 |
| | | | 714/776 |

(Continued)

*Primary Examiner* — Kibrom T Hailu
(74) *Attorney, Agent, or Firm* — JW Law Group; James M. Wu

(57) ABSTRACT

Methods and apparatus for decoding received uplink transmissions. In an embodiment, a method includes receiving a stream having data LLRs and second channel state information (CSI2) LLRs, and separating the data LLRs into a data stream and the CSI2 LLRs into a CSI2 stream based on configuration parameters. The method also includes decoding the data stream to generate decoded data, and decoding the CSI2 stream to generate decoded CSI2 information. An apparatus includes a first LLR preprocessor that receives a stream having data LLRs and second channel state information (CSI2) LLRs and separates the data LLRs into a data stream, and a second LLR preprocessor that receives the stream and separates the CSI2 LLRs into a CSI2 stream. The apparatus also includes a data decoder that decodes the data stream to generate decoded data, and a CSI2 decoder that decodes the CSI2 stream to generate decoded CSI2 information.

35 Claims, 14 Drawing Sheets

Related U.S. Application Data

(60) Provisional application No. 62/692,555, filed on Jun. 29, 2018.

(51) Int. Cl.
*H04L 1/00* (2006.01)
*H04W 72/21* (2023.01)

(58) Field of Classification Search
CPC ... H04L 5/0048; H04L 5/0051; H04L 5/0055; H04L 25/067; H04W 72/0413
See application file for complete search history.

(56) References Cited

U.S. PATENT DOCUMENTS

| | | | |
|---|---|---|---|
| 2017/0141895 A1* | 5/2017 | Tavildar | H04L 5/0053 |
| 2018/0198561 A1* | 7/2018 | Tsai | H03M 13/13 |

* cited by examiner

METHODS AND APPARATUS FOR DECODING RECEIVED UPLINK TRANSMISSIONS

PRIORITY

This is a continuation patent application of a co-pending U.S. patent application having a U.S. patent application Ser. No. 16/457,863, filed on Jun. 28, 2019 in the name of the same inventor and entitled "Methods and Apparatus for Decoding Received Uplink Transmissions," issued into a U.S. Pat. No. 11,212,144, which further claims the benefit of priority from a U.S. Provisional Application No. 62/692,555, filed on Jun. 29, 2018, and entitled "Method and Apparatus for Removing LLR Information Using LLR Pre-Processing via A Hardware Accelerator Block (HAB)," all of which are hereby incorporated herein by reference in their entirety.

FIELD

The exemplary embodiments of the present invention relate to operation of telecommunications networks. More specifically, the exemplary embodiments of the present invention relate to receiving and processing data streams using a wireless telecommunication network.

BACKGROUND

With a rapidly growing trend of mobile and remote data access over a high-speed communication network such as Long Term Evolution (LTE), fourth generation (4G), fifth generation (5G) cellular services, accurately delivering and deciphering data streams become increasingly challenging and difficult. The high-speed communication network, which is capable of delivering information includes, but is not limited to, wireless networks, cellular networks, wireless personal area networks ("WPAN"), wireless local area networks ("WLAN"), wireless metropolitan area networks ("MAN"), or the like. While WPAN can be Bluetooth or ZigBee, WLAN may be a Wi-Fi network in accordance with IEEE 802.11 WLAN standards.

In 5G systems, reference signals, data, and uplink control information (UCI) may be included in uplink transmissions from user equipment. The reference signals (RS) are used to estimate channel conditions or for other purposes. However, the reference signals are mixed in with data so that the reference signals must be accounted for when the data and/or UCI information is processed. For example, when processing resource elements (REs) received in an uplink transmission, special processing may be needed to skip over resource elements that contain reference signals. Even if the reference signals are set to zero or empty, their resource elements still need to be accounted for when processing the received data. It is also desirable to provide efficient descrambling, combining, and decoding functions to process received uplink transmissions.

Therefore, it is desirable to have a system that enables efficient processing of data and UCI information received in uplink transmissions.

SUMMARY

In various exemplary embodiments, methods and apparatus are provided for a decoding system that enables fast and efficient processing of received 4G and/or 5G uplink transmissions. In various exemplary embodiments, a decoder is provided that decodes received uplink control information in an efficient manner.

In an embodiment, a resource element identifier indexes and categorizes uplink control information (UCI) of received uplink symbols into one of three categories. For example, the UCI information comprises hybrid automatic repeat request ("HARQ") acknowledgements ("ACK"), first channel state information ("CSI1"), and second channel state information (CSI2). For example, category 0 is data or CSI2 information, category 1 is ACK information, and category 2 is CSI1 information. In one embodiment, the categorization information is forwarded to a combiner/extractor that receives descrambled resource elements. The categorization information is used to identify and combine uplink control information from the descrambled resource elements for each symbol. For example, resource elements containing ACK are combined, resource elements containing CSI1 are combined, and resource elements containing CSI2 are combined. The combining is performed over a selected number of received symbols.

In an embodiment, a decoder system is provided includes log-likelihood ratio (LLR) preprocessors that divide an LLR stream into separate data and CSI2 LLR streams. Separate decoders decode the streams to generate decoded information. Thus, in various exemplary embodiments, received uplink control information is descrambled, combined, and decoded to efficiently obtain UCI information to provide efficient processing and enhanced system performance.

In an embodiment, a method is provided that includes receiving a stream having data LLRs and second channel state information (CSI2) LLRs, and separating the data LLRs into a data stream and the CSI2 LLRs into a CSI2 stream based on configuration parameters. The method also includes decoding the data stream to generate decoded data, and decoding the CSI2 stream to generate decoded CSI2 information.

In an embodiment, an apparatus is provided that includes a first LLR preprocessor that receives a stream having data LLRs and second channel state information (CSI2) LLRs and separates the data LLRs into a data stream, and a second LLR preprocessor that receives the stream and separates the CSI2 LLRs into a CSI2 stream. The apparatus also includes a data decoder that decodes the data stream to generate decoded data, and a CSI2 decoder that decodes the CSI2 stream to generate decoded CSI2 information.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
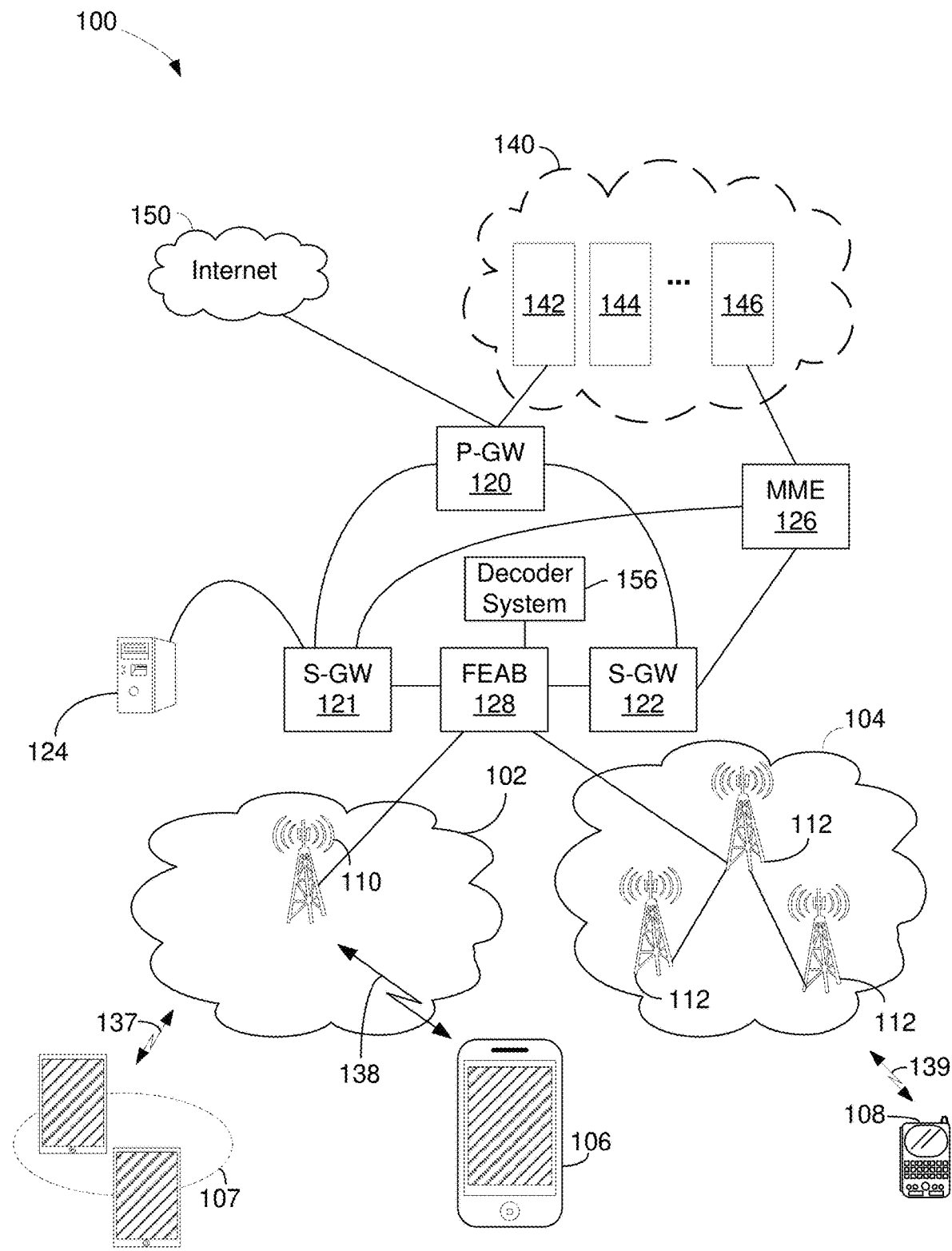
FIG. 1 shows a block diagram of a communication network in which resource elements received in uplink transmissions from user equipment are descrambled and combined by exemplary embodiments of a descrambling and combining system.

Aspects of the present invention are described below in the context of methods and apparatus for processing uplink information received in a wireless transmission.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

FIG. 1 shows a block diagram of a communication network 100 in which resource elements received in uplink transmissions from user equipment are decoded by exemplary embodiments of a decoder system 156. The network 100 includes packet data network gateway ("P-GW") 120, two serving gateways ("S-GWs") 121-122, two base stations (or cell sites) 102-104, server 124, and Internet 150. P-GW 120 includes various components 140, such as billing module 142, subscribing module 144, and/or tracking module 146 to facilitate routing activities between sources and destinations. It should be noted that the underlying concept of the exemplary embodiments would not change if one or more blocks (or devices) were added to or removed from network 100.

The network 100 may operate as a fourth generation ("4G"), Long Term Evolution (LTE), Fifth Generation (5G), New Radio (NR), or combination of 4G and 5G cellular network configurations. Mobility Management Entity (MME) 126, in one aspect, is coupled to base stations (or cell site) and S-GWs capable of facilitating data transfer between 4G LTE and 5G. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipment. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 4G and 5G packet core networks.

Base station 102 or 104, also known as cell site, node B, or eNodeB, includes one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices, such as UEs 106-107, with S-GW 121 via radio towers 110. It should be noted that base station or cell site can include additional radio towers as well as other land switching circuitry.

To improve efficiency and/or speed-up processing of uplink control information received in uplink transmissions from user equipment, the decoder system 156 is provided to decode data and UCI information received in uplink transmissions. A more detailed description of the decoder system 156 is provided below.

Figure 2:
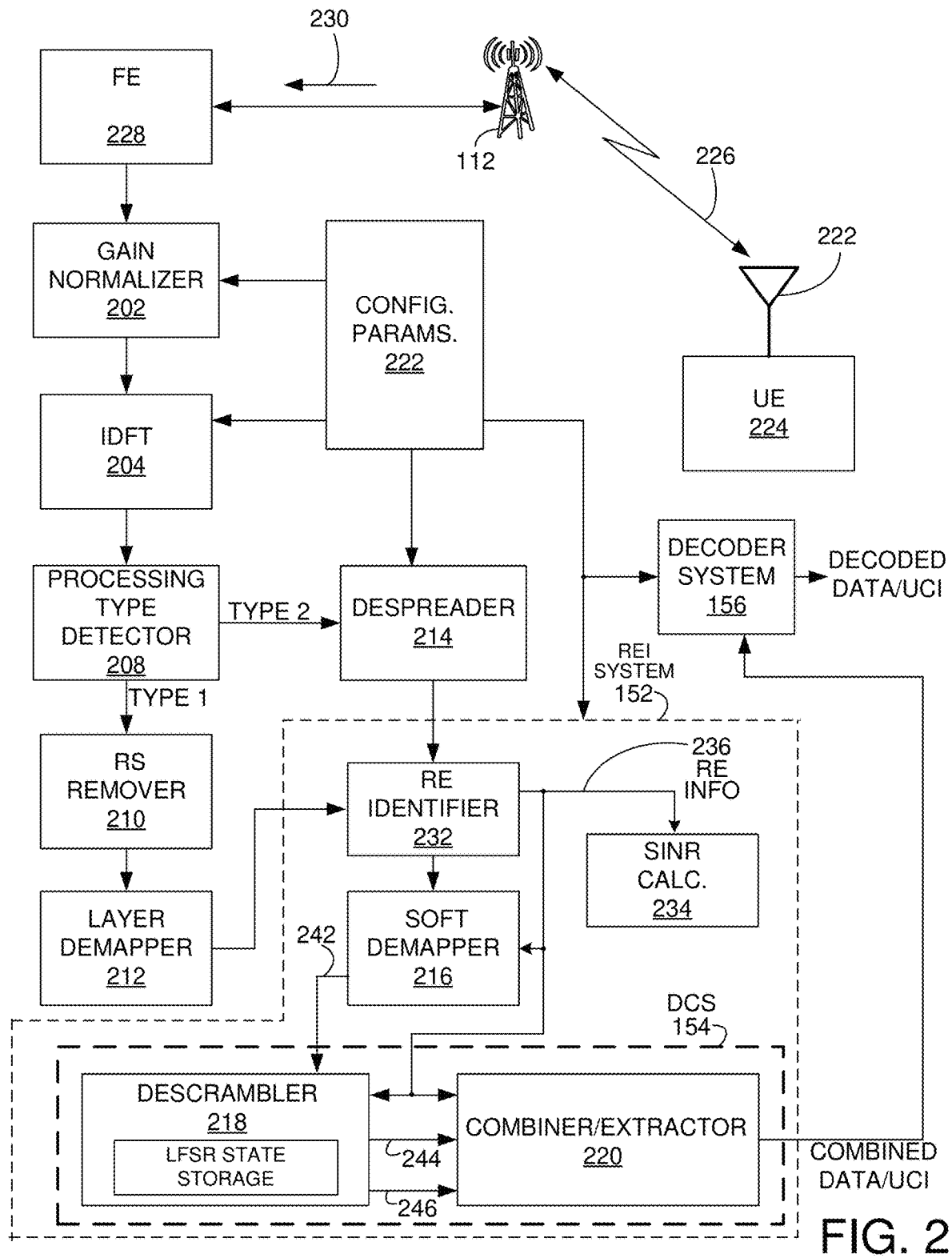
FIG. 2 shows an exemplary detailed embodiment of a descrambling and combining system.

FIG. 2 shows an exemplary detailed embodiment of an REI system 152. FIG. 2 shows user equipment ("UE") 224 having antenna 222 that allows wireless communication with base station 112 through wireless transmissions 226. The UE 224 transmits uplink communications 230 that are received by base station front end (FE) 228. In an embodiment, the base station includes gain normalizer 202, inverse transform block (IDFT) 204, configuration parameters 222, processing type detector 208, RS remover 210, layer demapper 212, despreader 214, and the REI system 152. In an embodiment, the REI system 152 comprises, RE identifier 232, soft demapper 216, SINR calculator 234 and a descrambling and combining system (DCS) 154. In an embodiment, the DCS 154 comprises descrambler 218 and combiner/extractor 220. In an embodiment, the combined data and UCI information output from the DCS 154 is input to the decoder system 156 that outputs decoded information.

In an embodiment, the receiver of the uplink transmission processes 1 symbol at a time, which may come from multiple layers for NR, and the receiver of the uplink transmission processes the whole subframe or slot of a layer for LTE covering 1 ms transmission time interval (TTI), 7-OFDM symbol (OS) short (s) TTI, and 2/3-OS sTTI. The modulation order can be derived as follows.
1. (π/2) BPSK for NR
2. (π/2) BPSK for LTE sub-PRB, QPSK, 16QAM, 64QAM, and 256QAM Furthermore, demapping rules apply to constellations as defined in LTE (4G) and/or NR (5G) Standards.

Configuration Parameters (Block 222)

In an embodiment, the configuration parameters 222 comprise multiple fields that contain parameters for use by multiple blocks shown in FIG. 2. For example, some of the configuration parameters 222 control the operation of the gain normalizer 202, IDFT 204, REI system 152, and decoder system 156. In an embodiment, the configuration parameters 222 may indicate that the gain normalizer 202 and the IDFT 204 are to be bypassed. In an embodiment, the configuration parameters 222 are used by the soft demapper 216 to determine when to apply special treatment when soft demapping received resource elements. The configuration parameters 222 are also used to control the operation of the descrambler 218, combiner/extractor 220, and/or the SINR calculator 234.

Gain Normalizer (Block 202)

In an embodiment, the gain normalizer 202 performs a gain normalization function on the received uplink transmission. For example, the gain normalizer 202 is applicable to LTE and NR DFT-s-OFDM cases. Input samples will be normalized as follows per data symbol per subcarrier with a norm gain value calculated per symbol as follows.

Gainnorm_out[Ds][sc]=(Gainnorm_in[Ds][sc])/(Norm_Gain[Ds])

IDFT (Block 204)

The IDFT 204 operates to provide an inverse transform to generate time domain signals. In an embodiment, the IDFT 204 is enabled only for LTE and NR DFT-s-OFDM and LTE sub-PRB. In an embodiment, the inputs and outputs are assumed to be 16 bits I and Q values, respectively. The DFT and IDFT operations are defined as follows.

$$DFT : X[k] = \frac{1}{\sqrt{N}} \sum_{n=0}^{N-1} x[n] W_N^{kn}$$

and $$IDFT : X[k] = \frac{1}{\sqrt{N}} \sum_{n=0}^{N-1} x[n] W_N^{-kn}$$

where $W_N = e^{-2\pi j/N}$.

Processing Type Detector (Block 208)

In exemplary embodiments, the processing type detector 214 detects the type of processing to be performed by the system. For example, this information may be detected from the configuration parameters 222. In an embodiment, the processing type detector 208 operates to detect one of two processing types, which cover the operation of the system as follows.
1. Type 1—5G NR DFT-s-OFDM
2. Type 1—5G NR CP-OFDM
3. Type 2—5G NR PUCCH Format 4

RS Remover (Block 210)

In an embodiment, the RS remover 210 operates during Type 1 processing to remove RS resource elements from the received data stream to produce a stream of data that is input to the layer demapper. For example, the RE locations of the RS symbols are identified and the data is re-written into one or more buffers to remove the RS symbols to produce an output that contains only data/UCI. In an embodiment, Type 1 processing includes RS/DTX removal, layer demapping with an interleaving structure, soft demapping, and descrambling. A benefit of removal of the RS REs before layering is to enable a single shot descrambling process without any disturbance in a continuous fashion with no extra buffering.

Layer Demapper (Block 212)

In an embodiment, data and signal to interference noise ratio (SINR) coming from multiple layers of a certain subcarrier will be transferred into a layer demapping circuit (not shown) via multi-threaded read DMA operation. In this case, each thread will point to the memory location of different layers for a certain symbol. The layer demapper 212 produces demapped data and multiple pSINR reports per layer. In an embodiment, for NR the DMRS/PTRS/DTX REs will be removed from the information stream prior to soft demapping for both I/Q and SINR samples.

Despreader (Block 214)

In an embodiment, the despreader 214 provides despreading Type 2 processing for PUCCH Format 4 only. Despreading comprises combining the repeated symbols along the frequency axis upon multiplying them with the conjugate of the proper spreading sequence. The spreading sequence index as well as the spreading type for combining the information in a correct way will be given by the configuration parameters 222. This process is always performed over 12 REs in total. The number of REs that will be pushed into subsequent blocks will be reduced by half or ¼th after despreading depending upon the spreading type. Combined results will be averaged and stored as 16-bit information before soft demapping.

REI System (Block 152)

In an embodiment, the REI system 152 comprises, the RE identifier 232, the soft demapper 216, the descrambler 218, the combiner/extractor 220, and the SINR calculator 234. During operation the REI system 152 categorizes resource elements and passes these categorized REs to the soft demapper 216 and one or more other blocks of the REI system 152. In an embodiment, the soft demapper 216 uses the categorized REs to determine when to apply special treatment to the soft demapping process.

In another embodiment, described in more detail below, the RE identifier 232 receives request for hypothesis index values for resource elements containing data/CSI2 information. The RE identifier 232 processes these requests to determine whether the RE contains data or a CSI2 value, and if the RE contains a CSI2 value by providing a hypothesis index value associated with the CSI2 value.

Resource Element Identifier (Block 232)

In an embodiment, the RE identifier 232 operates to process a received information stream of resource elements to identify, index, and categorized each element. An index and categorization of each element (e.g., RE information 236) is passed to the soft demapper 216 and other blocks of the REI system 152. A more detailed description of the operation of the RE identifier 232 is provided below.

Figure 3:
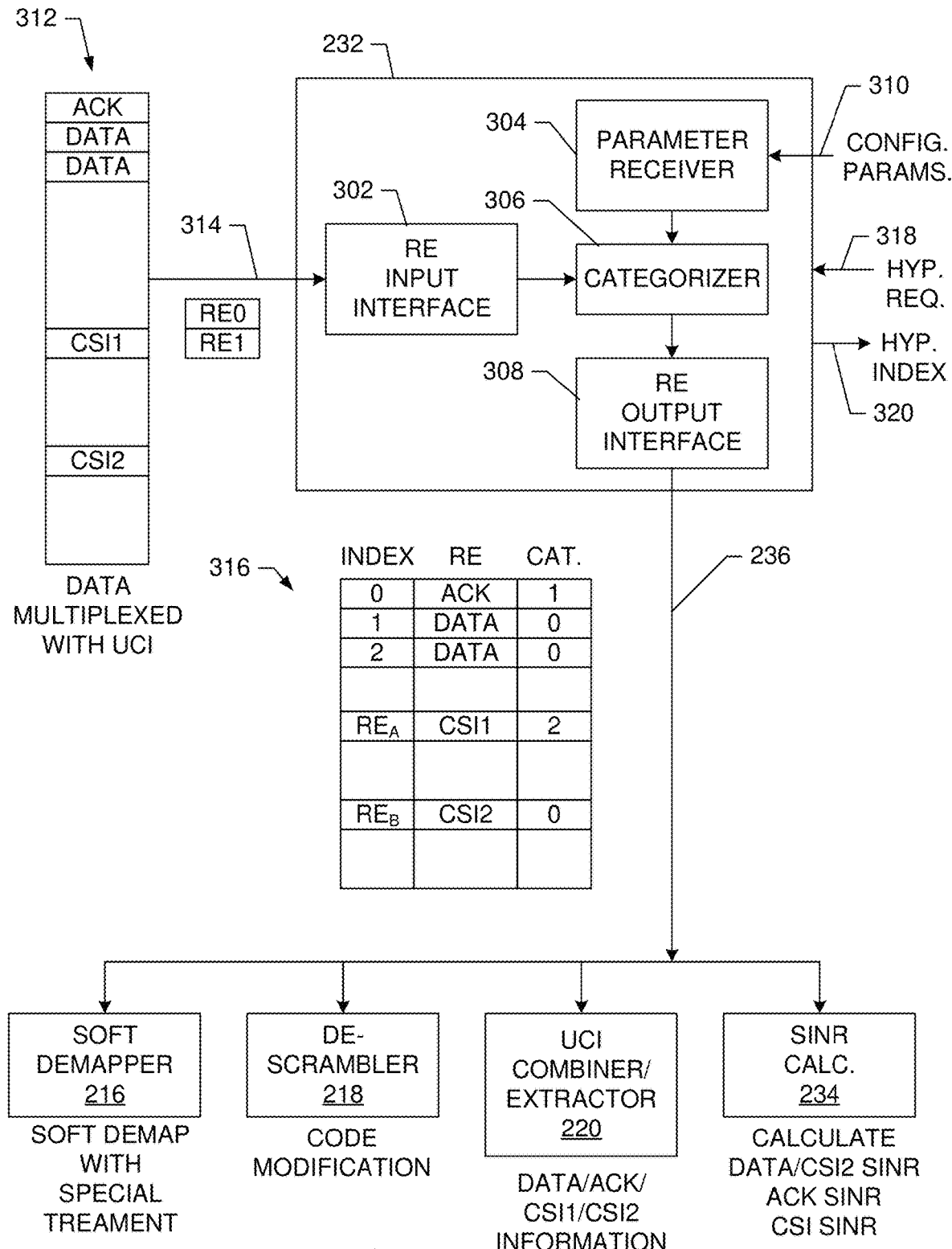
FIG. 3 shows a block diagram illustrating a detailed exemplary embodiment of an RE identifier block shown in FIG. 2.

FIG. 3 shows a block diagram illustrating a detailed exemplary embodiment of the RE identifier 232 shown in FIG. 2. As illustrated in FIG. 3, the RE identifier 232 comprises RE input interface 302, parameter receiver 304, categorizer 306, and RE output interface 308.

During operation, an uplink transmission is received and processed by the above described blocks to produce an information stream, such as the information stream 312. For example, the received uplink transmission is processed by at least one of the processing type detector 208, layer demapper 212 or the despreader 214. As a result, the information stream 312 does not contain any reference signals (RS) but contains data or data multiplexed with UCI information and this stream is input to the RE identifier 232.

The information stream 312, in one embodiment, includes information or data bits and UCI bits. In one example, the UCI bits, such as ACK bits, CSI1 bits, and/or data/CSI2 bits, are scattered throughout information stream 312. For instance, UCI bits are mixed with the data bits as illustrated.

In an embodiment, during 5G operation, the RE identifier 232 correctly identifies the RE indices of the UCI bits for soft demapper special treatment, descrambler code modification, and UCI combining/extraction as shown in FIG. 2. The RE indices of the UCI bits are also used for generating the SINR report values for ACK and CSI1 as well for NR CP-OFDM operation.

In an embodiment, the RE identification process will process 2 REs per cycle, indicated at 314. For example, the resource elements of the received stream 312 are received by the RE input interface 302, which provides the received information to the categorizer 306. The parameter receiver 304 receives parameters 310 from the configuration parameter block 222. The categorizer 306 uses these parameters to categorize the received resource elements and after categorizing the received REs, the categorizer 306 stores the categorized REs in an array, such as the array 316, which shows index, RE value, and category. In an embodiment, the identification of RE1 can be obtained based on multiple hypotheses of RE0. Similarly, RE2 identification can be derived based on multiple hypotheses of RE0 and RE1. The RE output interface 308 outputs the categorized REs to the soft demapper 216, descrambler 218, UCI combiner 220, and SINR calculator 234. In one aspect, the components of soft demapper 216, descrambler 218, UCI combiner 220, and SINR calculator 234 are interconnected for transferring certain information between the components.

In an exemplary embodiment, the RE identifier 232 receives a request 318 for a hypothesis index value for an RE that contains data/CSI2 information. The request is received from the combiner/extractor 220. In response to the request 318, the RE identifier 232 determines if the RE contains data or CSI2 information. If the RE contains CSI2 information, a hypothesis index value associated with the CSI2 value is determined. In an embodiment, there are up to eleven (0-10) hypotheses associated with the CSI2 information. The RE identifier 232 then outputs the determined hypothesis index value 320 to the combiner/extractor for further processing.

Referring again to FIG. 2, in various embodiments, the soft demapper 216 provides special treatment to REs based on certain UCI categories. The descrambler 218 is capable of providing scrambling code modification based on certain UCI categories. The UCI combiner/extractor 220 is capable of combining DATA, ACK, CSI1 and/or CSI2 information. The SINR calculator 234 is capable of calculating data/CSI2 SINR, as well as other RE related SINRs, such as an ACK SINR and a CSI SINR.

Soft Demapper

The soft demapping principle is based on computing the log-likelihood ratio (LLR) of a bit that quantifies the level of certainty on whether it is logical zero or one. The Soft demapper 216 processes symbol by symbol and RE by RE within a symbol.

The soft demapping principle is based on computing the log-likelihood ratio (LLR) of a bit that quantifies the level of certainty on whether it is logical zero or one. Under the assumption of Gaussian noise, LLR for the i-th bit is given by:

$$LLR_i = \ln\left(\frac{P(\text{bit}_i = 0/r)}{P(\text{bit}_i = 1/r)}\right) =$$

$$\ln\left(\frac{\sum_j e^{\frac{-(x-c_j)^2}{2\sigma^2}}}{\sum_k e^{\frac{-(x-c_k)^2}{2\sigma^2}}}\right) = \ln\left(\sum_j e^{\frac{-(x-c_j)^2}{2\sigma^2}}\right) - \ln\left(\sum_k e^{\frac{-(x-c_k)^2}{2\sigma^2}}\right)$$

where $c_j$ and $c_k$ are the constellation points for which i-th bit takes the value of 0 and 1, respectively. Note that for the gray mapped modulation schemes given in [R1], x may be taken to refer to a single dimension I or Q. Computation complexity increases linearly with the modulation order. A max-log MAP approximation has been adopted in order to reduce the computational complexity. Note that this approximation is not necessary for QPSK since its LLR has only one term on both numerator and denominator.

$$\ln \sum_m e^{-d_m} \cong \max(-d_m) = \min(d_m)$$

This approximation is accurate enough especially in the high SNR region and simplifies the LLR calculation drastically avoiding the complex exponential and logarithmic operations. Given that I and Q are real and imaginary part of input samples, the soft LLR is defined as follows for ($\pi/2$) BPSK, QPSK, 16QAM, 64QAM, and 256QAM, respectively.

In an embodiment, the soft demapper 216 includes a first minimum function component ("MFC"), a second MFC, a special treatment component ("STC"), a subtractor, and/or an LLR generator. A function of soft demapper 216 is to demap or ascertain soft bit information associated to received symbols or bit streams. For example, soft demapper 216 employs soft demapping principle which is based on computing the log-likelihood ratio (LLR) of a bit that quantifies the level of certainty as to whether it is a logical zero or one. To reduce noise and interference, soft demapper 216 is also capable of discarding one or more unused constellation points relating to the frequency of the bit stream from the constellation map.

The STC, in one aspect, is configured to force an infinity value as one input to the first MFC when the stream of bits is identified and a special treatment is needed. For example, a predefined control signal with a specific set of encoding categories such as ACK with a set of predefined encoding categories requires a special treatment. One of the special treatments, in one aspect, is to force infinity values as inputs to MFCs. For example, STC force infinity values as inputs to the first and the second MFCs when the stream of bits is identified as ACK or CSI1 with a predefined encoding category. The STC, in one instance, is configured to determine whether a special treatment (or special treatment function) is required based on received bit stream or symbols. In one aspect, the 1-bit and 2-bit control signals with predefined encoding categories listed in Table 1 require special treatments. It should be noted that Table 1 is exemplary and that other configurations are possible.

TABLE 1

| No. | Control Signal with Encoding Categories | Renamed Categories |
|---|---|---|
| 1 | $O^{ACK} = 1$ | ACK[1] |
| 2 | $O^{ACK} = 2$ | ACK[2] |
| 3 | $O^{CSI1} = 1$ | CSI1[1] |
| 4 | $O^{CSI1} = 2$ | CSI1[2] |

SINR Calculator (Block 234)

The SINR calculator 234 calculates SINR for per UCI type based on categories received from REI block 232.

Descrambler (Block 218)

The descrambler 218 is configured to generate a descrambling sequence of bits or a stream of bits. For example, after generating a sequence in accordance with the input value, the descrambler determines whether a descrambling sequence modification is needed for certain categories of control information to be descrambled. For example, the descrambler 218 receives the categorized RE information 236 from the RE identifier 232 and uses this information to determine when descrambling sequence modification is required. In an embodiment, the descrambler also provides for storage of intermediate linear feedback shift register (LFSR) states to facilitate continuous descrambling sequence generation over multiple symbols. The descrambled resource elements 244 of the symbols are passed to the combiner/extractor 220 along with corresponding descrambling sequences 246. A more detailed description of the descrambler 218 is provided below.

Combiner/Extractor (Block 220)

The combiner/extractor 220 provides a combining and extracting function to combine descrambled soft bits from the descrambler 218 and extract uplink control information. In an embodiment, the combiner/extractor 220 modifies its operation based on categories received from REI block 232. A more detailed description of the combiner/extractor 220 is provided below.

Decoder System (Block 156)

The decoder system 156 decodes the combined data and UCI information received from the combiner/extractor 220. In an embodiment, the decoder system 156 divides the combined data and CSI2 information into separate LLR streams based on the configuration parameters 222. The decoder system 156 then decodes each stream separately to generate decoded data and CSI2 information. A more detailed description of the decoder system 156 is provided below.

Figure 4A:
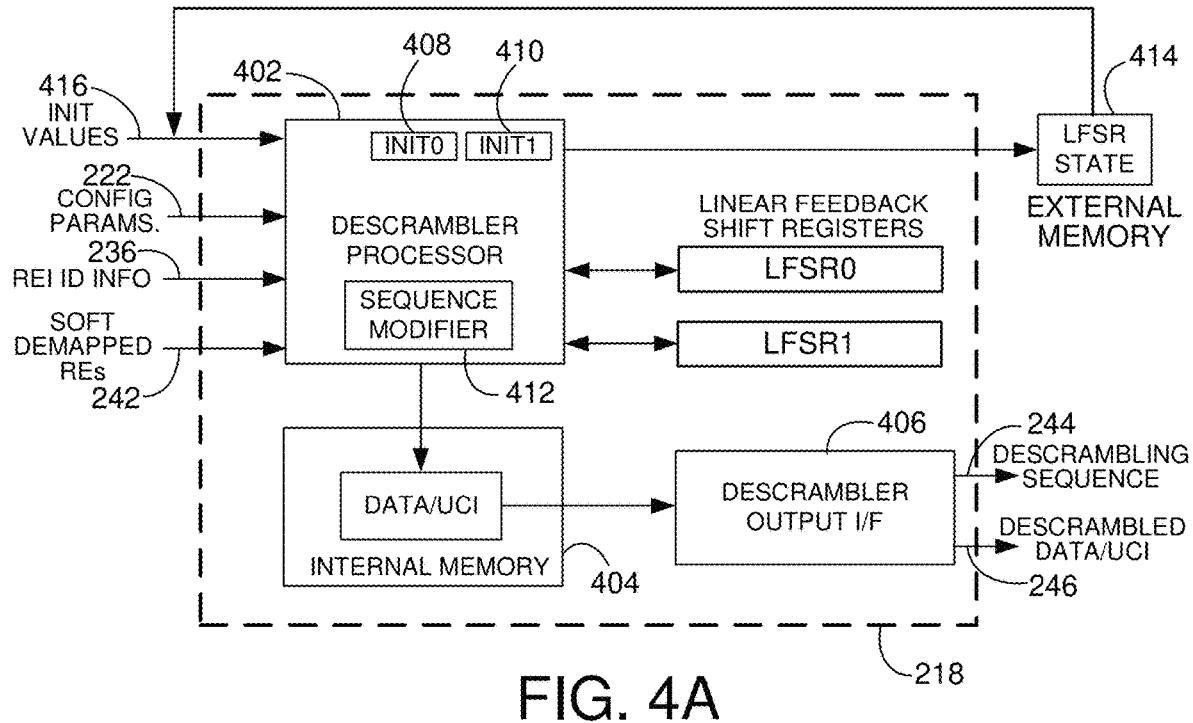
FIG. 4A shows a block diagram illustrating a detailed exemplary embodiment of a descrambler shown in FIG. 2.

FIG. 4A shows a block diagram illustrating a detailed exemplary embodiment of the descrambler 218 shown in FIG. 2. In an embodiment, the descrambler 218 comprises a descrambler processor 402, internal memory 404, linear feedback shift registers LFSR0 and LFSR1, and output interface 406. The descrambler processor 402 also includes a sequence modifier 412 that operates to modify descrambling sequences for certain categories of ACK and CSI1 information.

Figure 4B:
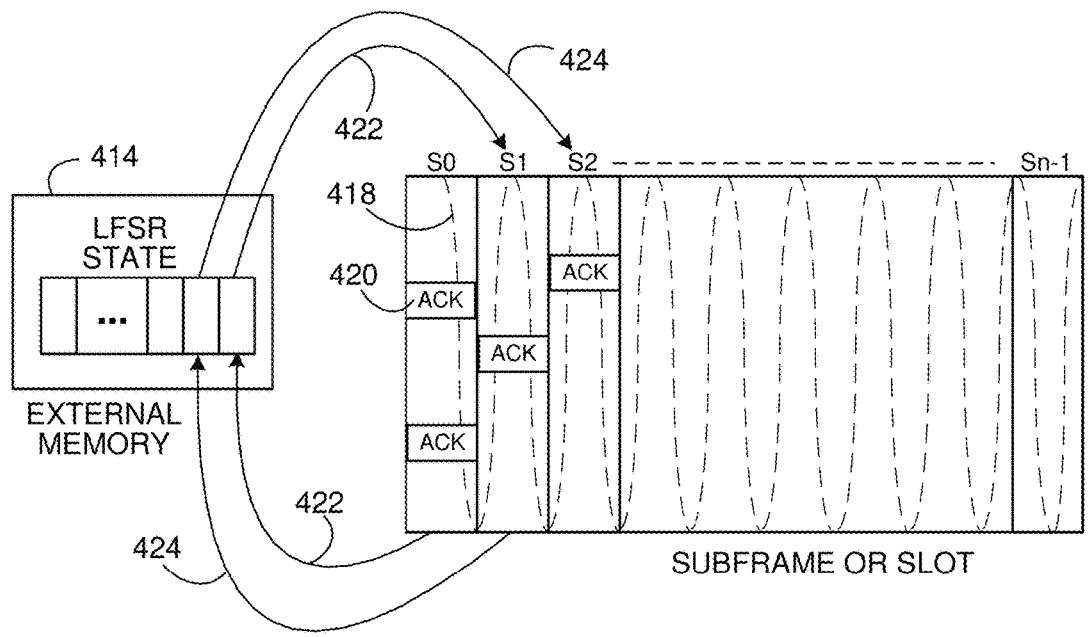
FIG. 4B shows a block diagram illustrating operations performed by the descrambler shown in FIG. 4A.

FIG. 4B shows a block diagram illustrating operations performed by the descrambler 218 shown in FIG. 4A. During operation, the descrambler processor 402 receives soft-demapped REs 242 from the soft demapper 216. The descrambler processor 402 also receives selected configuration parameters 222, the RE information 236, and initialization values 416. In an embodiment, the initialization values 416 are provided by a central processor or other receiver entity and stored as INIT0 408 and INIT1 410. The descrambler processor 402 initializes the LFSR0 and LFSR1 using initialization values INIT0 408 and INIT1 410, respectively. The shift registers LFSR0 and LFSR1 output bits that are used to determine descrambling bits that are used to descramble the received REs 242. For example, outputs of the shift registers LFSR0 and LFSR1 are mathematically combined by the descrambler processor 402 to determine descrambling bits to be used to descramble the received REs 242.

As resource elements of a first symbol are received, the descrambler processor 402 uses descrambling bits that are determined from the output of the shift registers to descramble the received REs 242. For example, as resource elements of symbol S0 are received, the descrambler processor 402 uses the generated descrambling bits to descramble the resource elements. As each RE is descrambled (as indicated by the path 418), the descrambled REs are stored in the internal memory 404. After descrambling of all the REs of the symbol is completed, the descrambler processor 402 stores the state of the shift registers LFSR0/1 into the external memory 414. For example, at the end of symbol S0, the state 422 of LFSR0/1 is stored in the external memory 414. It should also be noted that the sequence modifier 412 can be used to modify descrambling sequences for certain categories of ACK and CSI1 information.

Before REs of the next symbol (e.g., Si) are descrambled, the LSFR state 422 is restored from the external memory 414 and provided as initialization values 416 to the descrambler processor 402. Thus, the restored state allows the operation of the shift registers to continue from where they left off after the completion of descrambling the previous symbol (e.g., S0). After descrambling the symbol Si, the descrambler processor 402 stores the state of the shift registers (indicated at 424) into the external memory 414. Prior to the start of descrambling of the symbol S3, the state 424 is restored to the LFSR registers of the descrambler processor 402 as described above. This process of storing and restoring the shift registers state continues until all the REs of all the symbols have been descrambled. It should be noted that the REs include data or UCI information. For example, symbol S0 includes the ACK 420 information shown in FIG. 4B. After the REs are descrambled, they are output by the descrambler output interface 406 as the descrambled REs 244 to the combiner/extractor 220. In an embodiment, the descrambling sequences 246 used to descramble the REs are also provided to the combiner/extractor 220.

Figure 5A:
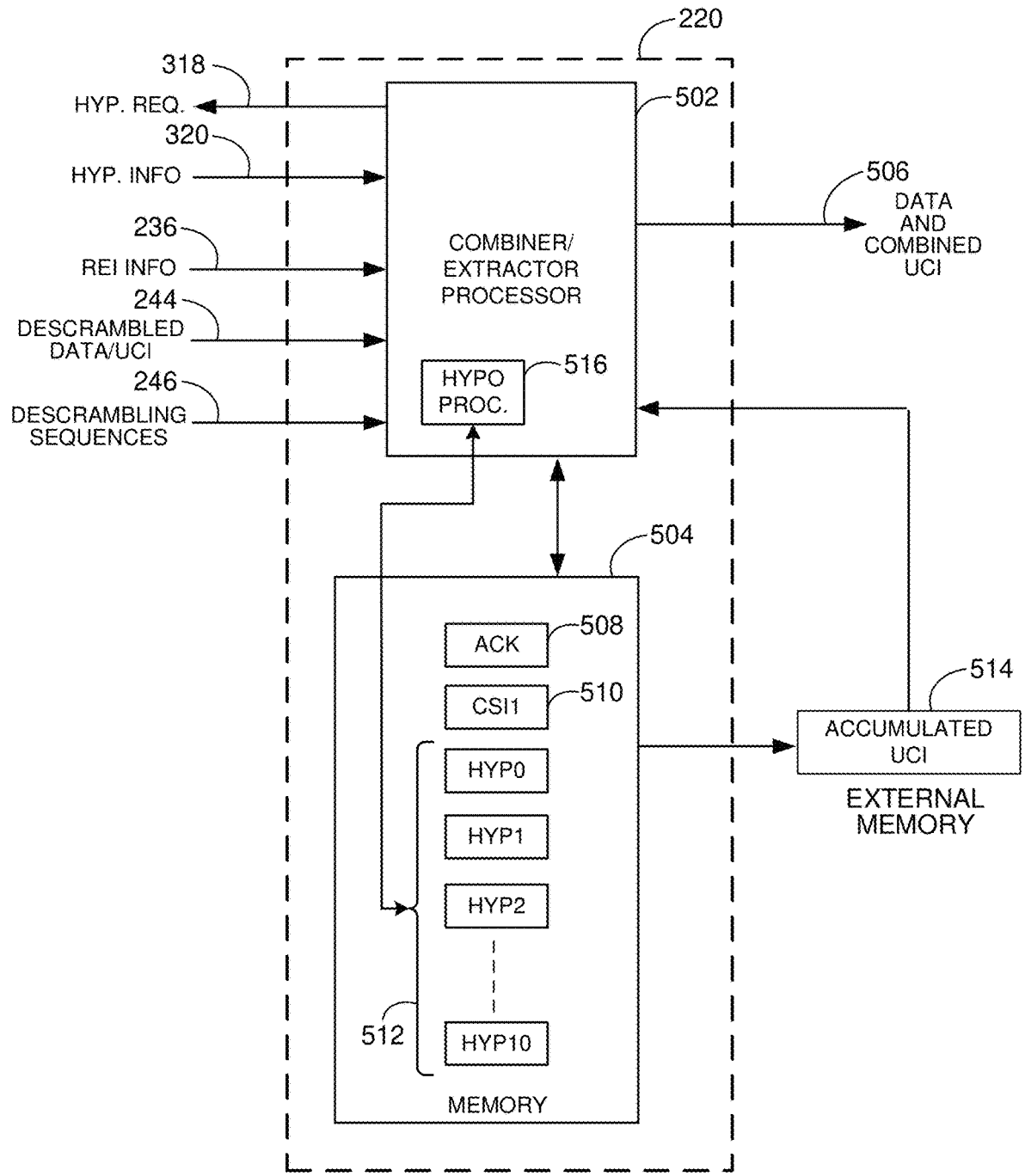
FIG. 5A shows a block diagram illustrating an exemplary embodiment of a combiner/extractor shown in FIG. 2.

FIG. 5A shows a block diagram illustrating a detailed exemplary embodiment of the combiner/extractor 220 shown in FIG. 2. In an embodiment, the combiner/extractor 220 comprises combiner/extractor processor 502 and internal storage 504. The processor 502 includes hypothesis processor 516. During operation, the processor 502 receives the RE information 236 and the descrambled REs 244 from the descrambler 218. The processor 502 also receives descrambling sequences 246 that were used to descramble the descrambled REs 244. The processor 502 uses the RE information 236 to determine which REs represent UCI values. For example, the RE information 236 comprises indexed and categorized RE information so that the processor 502 can use this information to determine when selected UCI REs are received.

At the start of a symbol, the processor 502 initializes ACK 508, CSI1 510, and eleven (0-10) hypothesis CSI2 512 values in the memory 504. When REs containing ACK and CSI1 information are received, the processor 502 combines this information with values currently in the memory 504. For example, the processor 502 uses the REI information 236 to determine when ACK information bits are received and combines these bits with currently stored ACK bits 508. This process continues for ACK 508 and CSI1 510.

When CSI2 information is received, the 512, the hypothesis processor 516 operates to determine one of the hypotheses 512 in which to accumulate the CSI2 information. A more detailed description of the operation of the hypothesis processor 516 is provided below.

Once all the REs of a symbol have been received, the combined values are written out to an external memory 514. Prior to the start of the next symbol, the values in the external memory 514 are returned to the processor 502 and restored to the internal storage 504. Combining of the UCI values of the next symbol is then performed.

After the UCI information in each symbol is combined, the results are stored in the external memory 514. The process continues until the UCI information from a selected number of symbols has been combined. Once the combining process is completed, the processor 502 outputs the combined results 506 to a decoder.

Figure 5B:
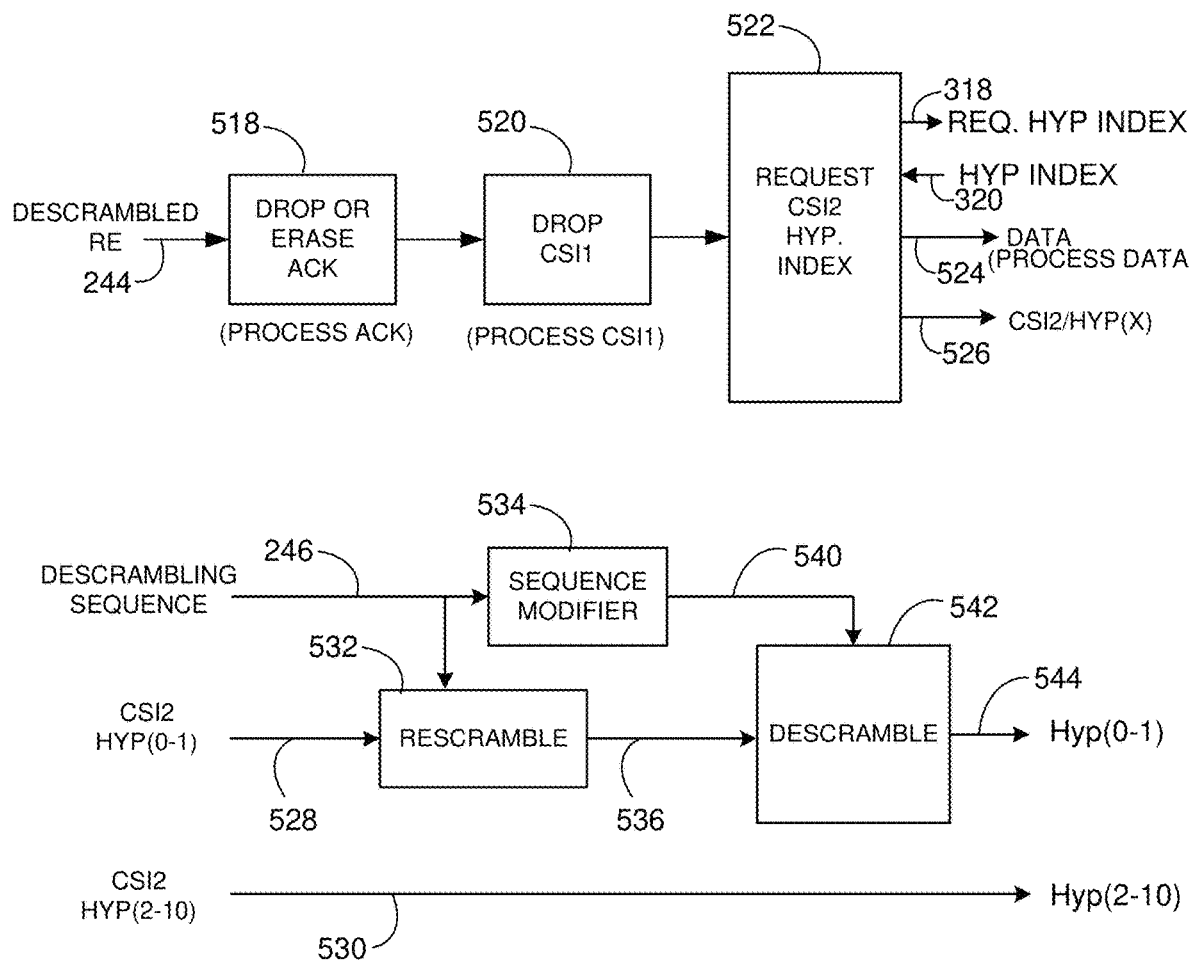
FIG. 5B shows a block diagram illustrating operations performed by the combiner/extractor shown in FIG. 5A.

FIG. 5B shows a block diagram illustrating operations performed by the combiner/extractor 220 shown in FIG. 5A. In an embodiment, the hypothesis processor 516 receives the descrambled RE stream 244 and the descrambling sequences 246 used to descramble the REs of the descrambled stream. The processor 516 drops or erases ACK information (indicated at 518) from the descrambled stream 416 to generate a stream that includes only CSI1 and data/CSI2 information. Next the processor 516 drops CSI1 information (indicated at 520) from the stream to generate the stream that includes only data/CSI2 information. The processor 516 then performs function 522 to identify hypotheses that are associated with the data/CSI2 stream. For example, the processor 516 sends out the request 318 to the RE identifier 232 to identify a hypothesis index value associated with data/CSI2 information. The RE identifier 232 returns identifying information that indicates whether or not the data/CSI2 information comprises data or CSI2 information. If data, then the data 524 is output for further processing. If CSI2, then the hypothesis index is received that indicates the hypothesis associated with the CSI2 information. The CSI2 information and its hypothesis 526 are then further processed.

The hypothesis processor 516 receives the CSI2/Hyp 526 and performs further processing. If the hypothesis is in the range of (2-10) as indicated at 530, the CSI2 information is passed for accumulation in the memory 504. If the hypothesis is in the range of (0-1), the CSI2 value is input to a rescrambling function 532 that uses the received descrambling sequence 246 to rescramble the CSI2 information to recover the CSI2 information 536 prior to descrambling. The descrambling sequence 246 is modified by modifier function 534 to generate a modified descrambling sequence 540. The modified descrambling sequence 540 is used by a descrambling function 542 to descramble the rescrambled CSI2 information 536 to generate modified descrambled CSI2 information 544. The modified CSI2 information is passed for accumulation in the memory 504.

Combined Soft Output for UCI

In an exemplary embodiment, the output for UCI soft-combining can be summarized as follows.

1-Bit UCI Case

A. 1 soft-combined UCI output with 16-bit bitwidth

B. 1 soft-combined 'x' labeled bit output with 16-bit bitwidth for ACK and only for 16QAM, 64QAM, and 256QAM.

struct UCI_REPORT_1BIT { int16_t uci_soft_combined;

int16_t uci_x_soft_combined; // valid only for ACK and 16QAM, 64QAM, 256QAM int16_t reserved[30];

}

For 2-Bit UCI Case

A. 3 soft-combined UCI output for 2-bit UCI case with 16-bit bitwidth

B. 1 soft-combined 'x' labeled bit output with 16-bit bitwidth for ACK and only for 16QAM, 64QAM, and 256QAM struct UCI_REPORT_2BIT { int16_t uci_soft_combined[3];// c0, c1, c2 int16_t uci_x_soft_combined; // valid only for ACK and 16QAM, 64QAM, 256QAM int16_t reserved[28];

}

For RM Encoding ($3 \leq O^{UCI} \leq 11$) Case
A. 1 set of 32 soft-combined UCI output with 16-bit bitwidth as an input to the RM decoder.
  struct UCI_REPORT_RM {
    int16_t uci_soft_combined [32];
  }
CSI2 Case In an exemplary embodiment, there will be up to 11 soft-combined results in total each corresponding to a hypothesis. The soft combining methodology for each hypothesis is fixed and given in Table 2 below.

TABLE 2

| CSI2 soft-combining per hypothesis | |
|---|---|
| Hypothesis # | Soft combining method |
| Hypothesis 0 | 1-bit soft combining |
| Hypothesis 1 | 2-bit soft combining |
| Hypothesis 2 to Hypothesis 10 | Reed muller (RM) soft combining |

Note that LLR modification may be required for hypothesis 0 and hypothesis 1 due to the presence of 'x' and 'y' bits depending upon the modulation type and the scrambling sequence prior to soft combining operation. This is illustrated in Table 3 below.

| CSI2 combining example for multiple hypothesis | | | | | |
|---|---|---|---|---|---|
| | Scrambling seq | Hypo0 | Hypo1 | Hypo2-Hypo10 | |
| CSI2 RE | 11r0 | 1 | 1 | 1 | 1 |
| | 11r1 | −1 | 1* | −1 | −1 |
| | 11r2 | −1 | 1* | 1* | −1 |
| | 11r3 | 1 | 1* | 1* | 1 |
| | Stream out along with data | 1-bit combiner input | 2-bit combiner input | RM combiner input | |
| CSI2 RE | 11r0 | 11r0 | 11r0 | 11r0 | 11r0 |
| | 11r1 | −11r1 | 11r1 | −11r1 | −11r1 |
| | 11r2 | −11r2 | 11r2 | 11r2 | −11r2 |
| | 11r3 | 11r3 | 11r3 | 11r3 | 11r3 |

*x/y bit modification

Figure 6:
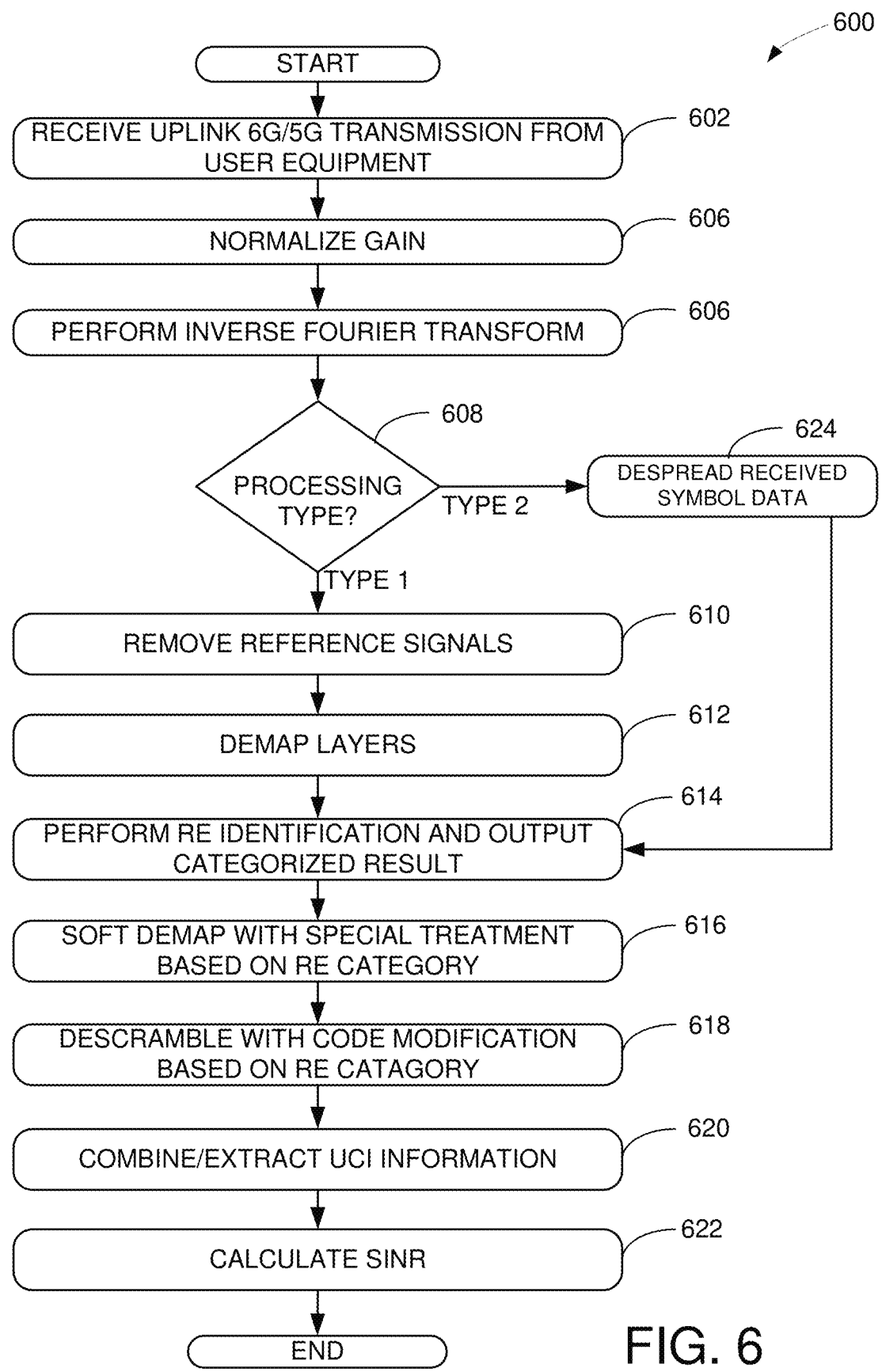
FIG. 6 shows an exemplary method for performing resource element categorization in accordance with exemplary embodiments of a resource element identification system.

FIG. 6 shows an exemplary method 600 for performing resource element categorization in accordance with exemplary embodiments of an REI system. For example, the method 600 is suitable for use with the REI system 152 shown in FIG. 2.

At block 602, uplink transmissions are received in a 5G communication network. For example, the uplink transmissions are received at the front end 228 shown in FIG. 2.

At block 604, gain normalization is performed. For example, the gain normalization is performed by the gain normalizer 202 shown in FIG. 2.

At block 606, an inverse Fourier transform is performed to obtain time domain signals. For example, this process is performed by the IDFT block 204 shown in FIG. 2.

At block 608, a determination is made as to a type of processing to be performed. For example, a description of two processing types is provided above. If a first type of processing is to be performed, the method proceeds to block 610. If a second type of processing is to be performed, the method proceeds to block 624. For example, this operation is performed by the processing type detector 208 shown in FIG. 2.

At block 624, when the processing type is Type 2, despreading is performed on the received resource elements. For example, this operation is performed by the despreader 214 shown in FIG. 2. The method then proceeds to block 614.

When the processing type is Type 1, the follow operations are performed.

At block 610, the reference signals are removed from the received resource elements. For example, resource elements containing RS/DTX are removed. This operation is performed by the RS remover 210 shown in FIG. 2.

At block 612, layer demapping is performed. For example, the resource elements without RS/DTX are layer demapped. This operation is performed by the layer demapper 212.

At block 614, RE identification and categorization is performed. For example, as illustrated in FIG. 3, the RE identifier 232 receives a stream of REs, categorizes the REs, and then outputs the array 316 in which the REs are indexed and include categorization values.

At block 616, soft demapping is performed. For example, the soft demapper 216 soft-demaps the REs with special treatment provided based on the categorization of the received REs. The soft demapper 216 produces a soft-demapped output that is input to the descrambler 218.

At block 618, descrambling is performed. For example, the descrambler 218 receives the soft demapped bits from the soft demapper 216 and generates descrambled bits. In an embodiment, based on the categorization of the REs, a modified descrambler code is used. In an embodiment, the descrambler 218 operates to save LFSR state between symbols so that continuous descrambling code generation can be provided from symbol to symbol.

At block 620, combining and extraction of UCI information is performed. For example, the combiner/extractor 220 receives the descrambled bits, combines these bits, and extracts the UCI information. For example, the combiner/extractor 220 utilizes the RE categorization information to identify UCI resource elements and combines these elements into the memory 504. The combined UCI values are output at the end of the symbol and the memory is reinitialized for the combining UCI of the next symbol.

At block 622, SINR calculations are performed to calculate data/CSI2, ACK, and CSI1 SINR values.

Thus, the method 600 operates to provide resource element identification and categorization in accordance with the exemplary embodiments. It should be noted that the operations of the method 600 can be modified, added to, deleted, rearranged, or otherwise changed within the scope of the embodiments.

Figure 7:
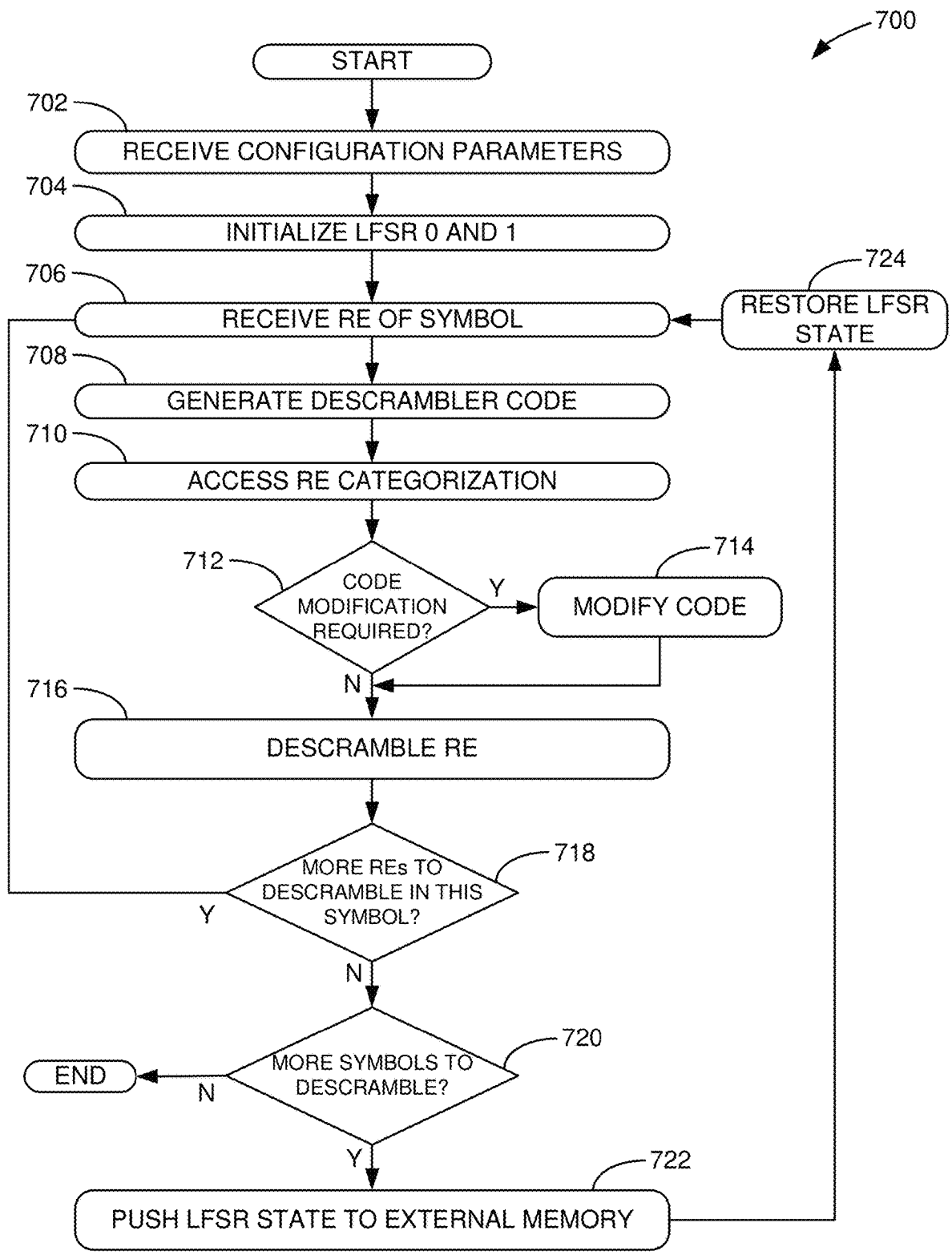
FIG. 7 shows an exemplary method for performing descrambling in accordance with exemplary embodiments of a descrambling and combining system.

FIG. 7 shows an exemplary method 700 for performing descrambling in accordance with exemplary embodiments of a descrambling and combining system. For example, the method 700 is suitable for use with the DCS 154 shown in FIG. 2.

At block 702, configuration parameters and initialization values are received by the descrambler 218. For example, the configuration parameters 222 are received by the descrambler processor 402. In addition, the initialization values 416 are received by the descrambler processor 402. In an embodiment, the initialization values 416 are received from a central processing entity at the receiver. In another embodiment, the initialization values 416 are LFSR state information received from the external memory 414.

At block 704, one or more linear feedback shift registers are initialized. For example, the processor 402 initializes the registers LFSR0 and LFSR1 with initialization values INIT0 408 and INIT1 410, respectively.

At block 706, a resource element of a symbol is received. For example, the processor 402 receives a resource element of the symbol S0 as shown in FIG. 4B.

At block 708, a descrambling code is generated. For example, the processor 402 generates the descrambling code based on the output of the shift registers LFSR0 and LFSR1.

At block 710, the RE information is accessed by the processor to determine information about the current resource element. For example, the processor 402 accesses information about the current resource element based on the RE information 236 and the parameters 222.

At block 712, a determination is made as to whether scrambling code modification should be made. For example, the processor 402 determines if a descrambling code modification is needed to descramble the current resource element based on the RE information 236 and the parameters 222. If modification of the scrambling code is needed, the method proceeds to block 714. If no modification is needed, the method proceeds to block 716.

At block 714, the scrambling code is modified by the processor 402 as necessary. For example, the sequence modifier 412 modifies the scrambling code for certain types of ACK and CSI1 information.

At block 716, the RE is descrambled using the scrambling code. For example, the processor 402 descrambles the RE using the current scrambling code.

At block 718, a determination is made as to whether there are more REs in the current symbol to descramble. For example, the processor 402 makes this determination from the configuration parameters 222 and/or the RE information 236. If there are no more symbols to descramble, the method proceeds to block 720. If there are more symbols to descramble in the current symbol, the method proceeds to block 706.

At block 720, a determination is made as to whether there are more symbols to descramble. For example, the processor 402 makes this determination from the configuration parameters 222 and/or the RE information 236. If there are no more symbols to descramble, the method end. If there are more symbols to descramble, the method proceeds to block 722.

At block 722, the LFSR state is stored. For example, the processor 402 pushes the current state of the registers LFSR0 and LFSR1 to the external memory 414, for example, as shown by 422.

At block 724, the LFSR state is restored prior to descrambling the next symbol. For example, the stored LFSR state from the memory 414 is provided to the processor 402 as a new set of initialization values 416 that are used to restore the state of the registers LFSR0 and LFSR1. Thus, the LFSR generates descrambling sequences based on the restored state. The method then proceeds to block 706 where descrambling continues until the desired number of symbols have been descrambled.

Thus, the method 700 operates to provide descrambling in accordance with exemplary embodiments of a descrambling and combining system. It should be noted that the operations of the method 700 can be modified, added to, deleted, rearranged, or otherwise changed within the scope of the embodiments.

Figure 8:
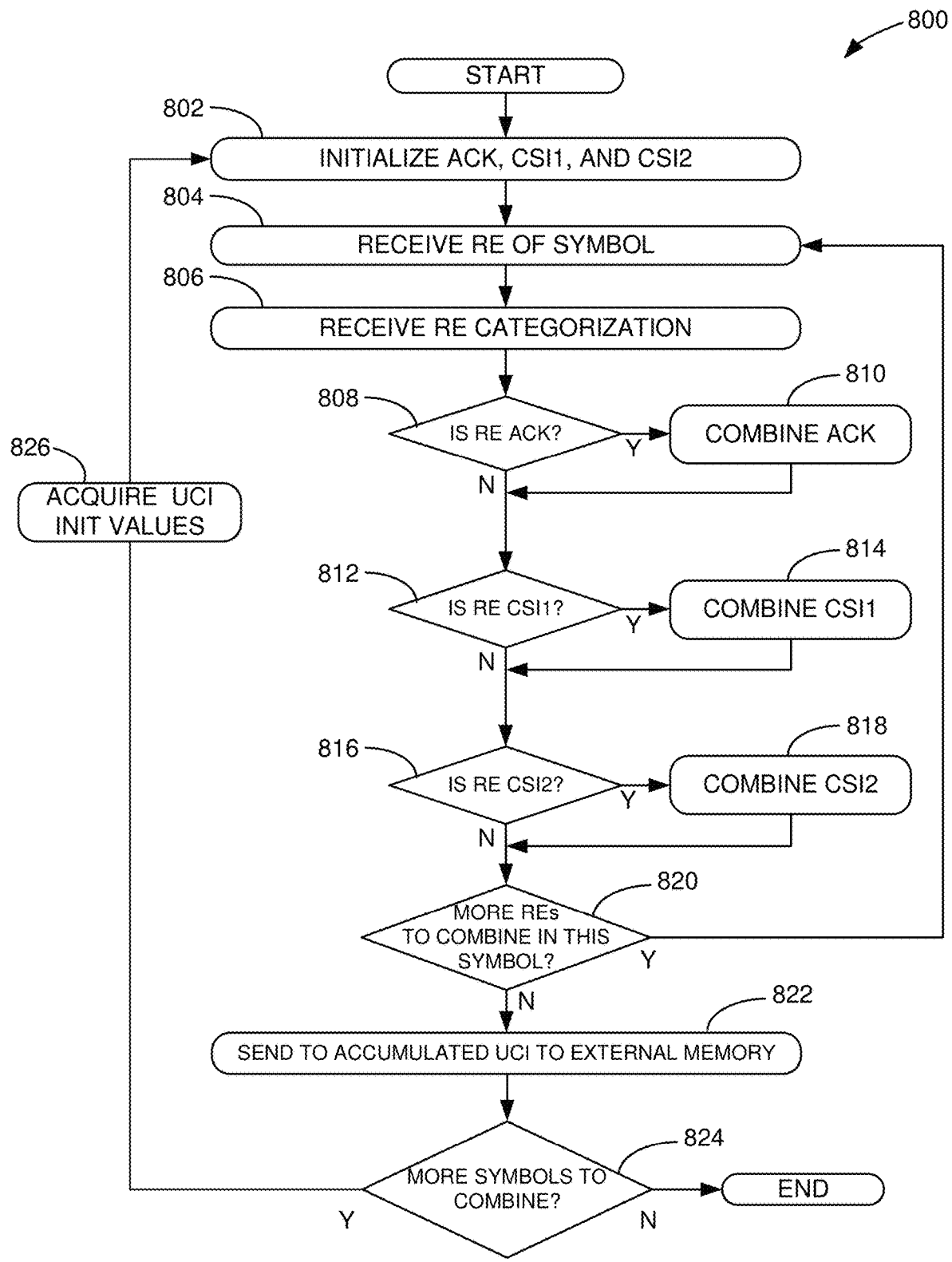
FIG. 8 shows an exemplary method for performing combining in accordance with exemplary embodiments of a descrambling and combining system.

FIG. 8 shows an exemplary method 800 for performing combining in accordance with exemplary embodiments of a descrambling and combining system. For example, the method 800 is suitable for use with the DCS 154 shown in FIG. 2.

At block 802, initialization of ACK, CSI1, and CSI2 values in a memory is performed. For example, in an embodiment, the processor 502 initializes the values of ACK 508, CSI1 510, and CSI2 512 in the memory 504.

At block 804, a descrambled RE of a symbol is received. For example, the processor 502 receives the descrambled RE 244.

At block 806, RE categorization information is received. For example, the processor 502 receives the RE information 236.

At block 808, a determination is made as to whether the current RE contains an ACK value. The processor 502 makes this determination from the RE information 236. If the current RE contains an ACK value the method proceeds to block 810. If the current RE does not contain an ACK value, the method proceeds to block 812.

At block 810, the ACK value contained in the current RE is combined with ACK values in memory. For example, the processor 502 combines the current RE value with the stored ACK value 508 and restores the combined value back into the memory 504.

At block 812, a determination is made as to whether the current RE contains a CSI1 value. The processor 502 makes this determination from the RE information 236. If the current RE contains a CSI1 value the method proceeds to block 814. If the current RE does not contain a CSI1 value, the method proceeds to block 816.

At block 814, the CSI1 value contained in the current RE is combined with CSI1 values in memory. For example, the processor 502 combines the current RE value with the stored CSI1 value 510 and restores the combined value back into the memory 504.

At block 816, a determination is made as to whether the current RE contains a CSI2 value. The processor 502 makes this determination from the RE information 236. If the current RE contains a CSI2 value the method proceeds to block 818. If the current RE does not contain a CSI2 value, the method proceeds to block 820.

At block 818, the CSI2 value contained in the current RE is combined with CSI2 values in memory. For example, the processor 502 combines the current RE value with the one of the stored hypothesis CSI2 values 512 and restores the combined value back into the memory 504. A detailed description of the combining of CSI2 values is provided with respect to FIGS. 9A-B.

At block 820, a determination is made as to whether there are more REs to combine in the current symbol. The processor 502 makes this determination from the RE information 236. If there are more REs to combine, the method proceeds to block 804. If there are no more REs to combine, the method proceeds to block 822.

At block 822, the accumulated UCI values are pushed to an external memory. For example, the accumulated UCI values are pushed to the external memory 514.

At block 824, a determination is made as to whether there are more symbols to combine. In an embodiment, the processor 502 makes this determination from the REI information 236. If there are no more symbols to combine, the method ends. If there are more symbols to combine, the method proceeds to block 826.

At block 826, the UCI values stored in the external memory are acquired and input to the processor 502 as new initialization values. For example, the accumulated UCI values stored in the external memory 514 are acquired by the processor 502. The method then proceeds to block 802 where the acquired UCI values from the external memory are used to initialize the UCI values 508, 510, and 512 in the internal storage 504.

Thus, the method 800 operates to provide combining in accordance with exemplary embodiments of a descrambling and combining system. It should be noted that the operations of the method 800 can be modified, added to, deleted, rearranged, or otherwise changed within the scope of the embodiments.

Figure 9A:
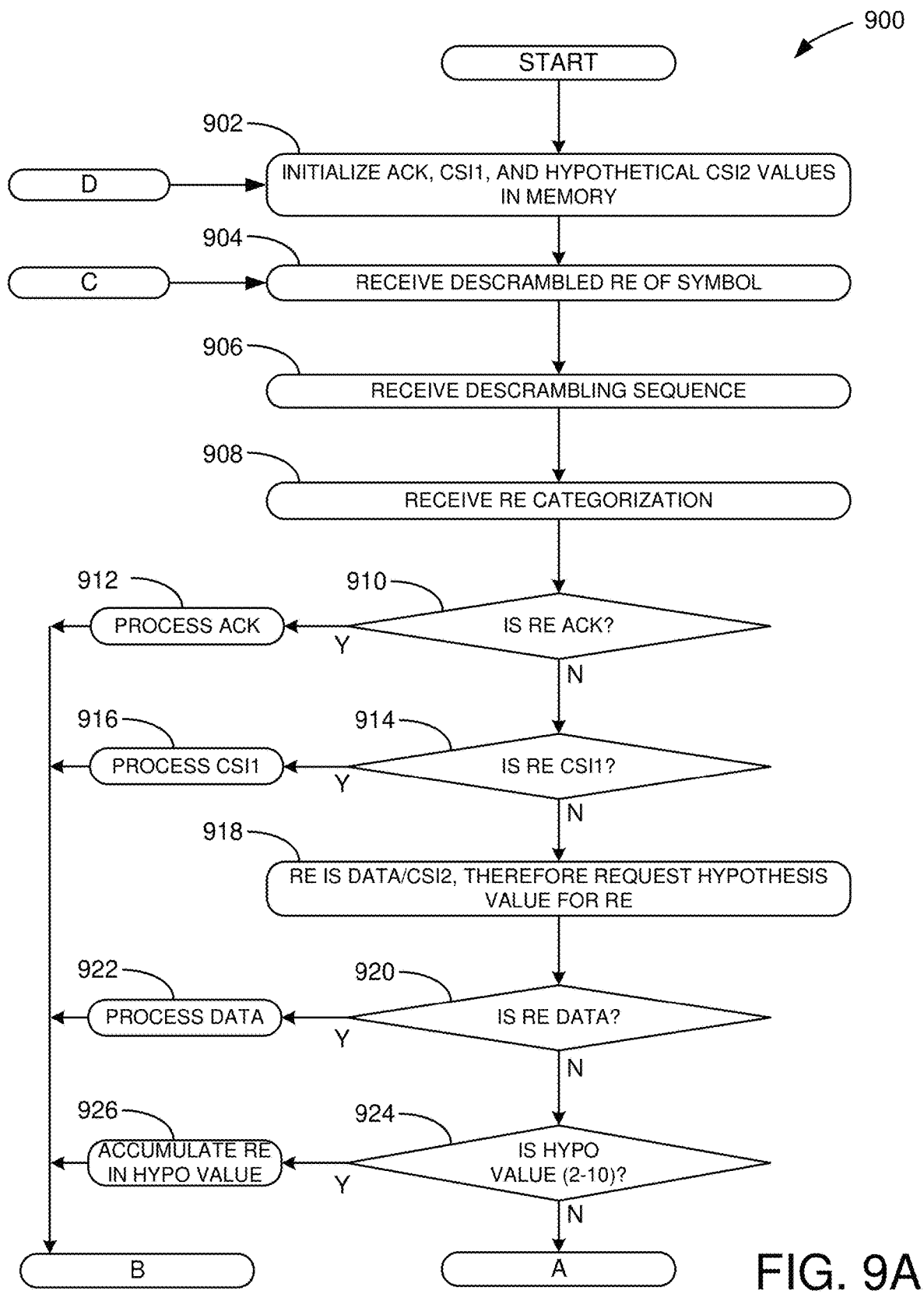
FIGS. 9A-B shows an exemplary method for performing combining in accordance with exemplary embodiments of a descrambling and combining system.
Figure 9B:
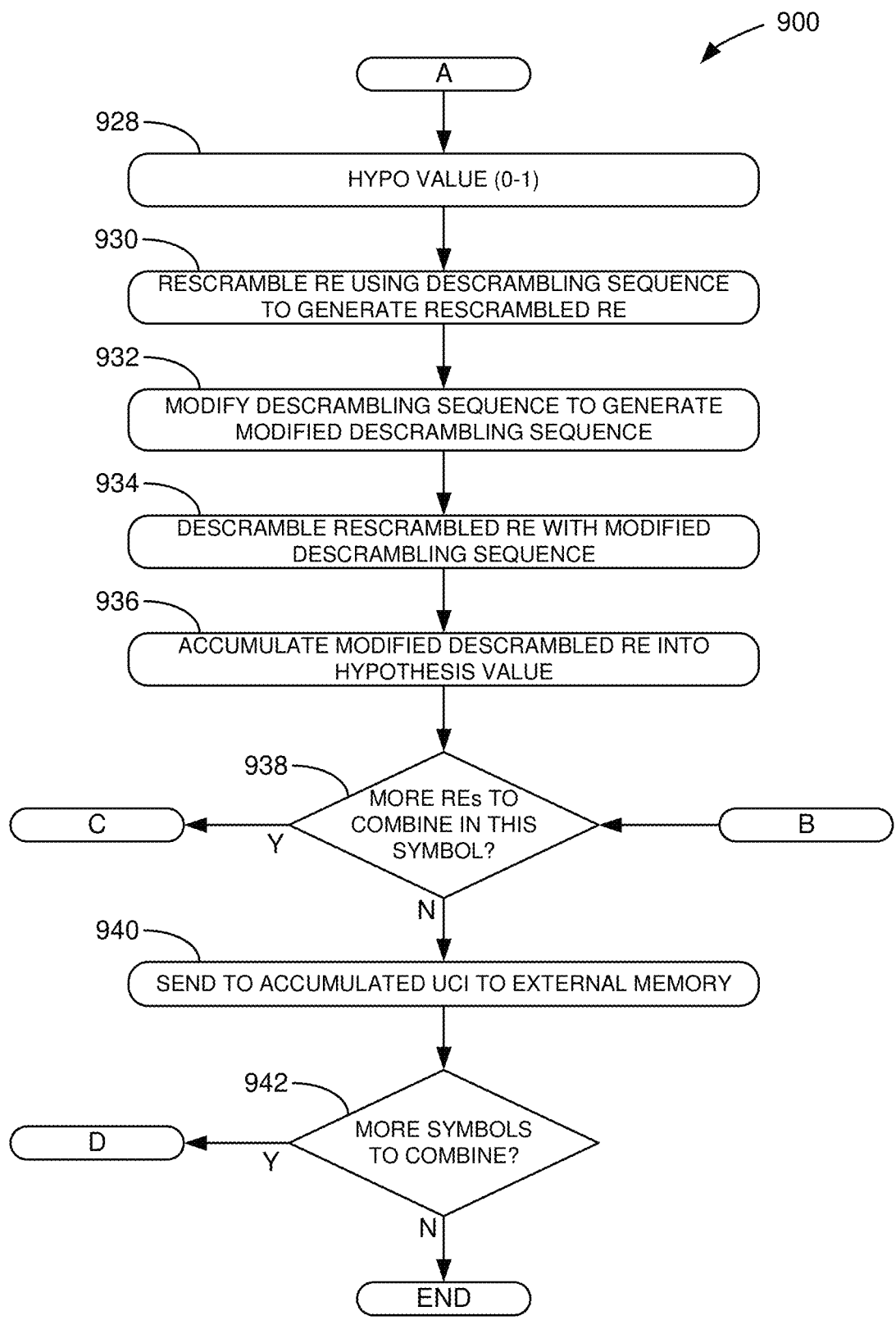

FIGS. 9A-B shows an exemplary method 900 for performing combining in accordance with exemplary embodiments of a descrambling and combining system. For example, the method 900 is suitable for use with the DCS 154 shown in FIG. 2.

Referring now to FIG. 9A, at block 902, initialization of ACK, CSI1, and eleven hypothesis CSI2 values in a memory is performed. For example, in an embodiment, the processor 502 initializes the ACK 508, CSI1 510, and eleven hypothesis CSI2 values 512 in the memory 504. In an embodiment, the values used to initialize the memory 504 are received from the external memory 514 (indicated by D).

At block 904, a descrambled RE of a symbol is received. For example, the processor 502 receives the descrambled RE 244.

At block 906, a descrambled sequence is received. For example, the processor 502 receives the descrambling sequence 246.

At block 908, RE categorization information is received. For example, the processor 502 receives the RE information 236.

At block 910, a determination is made as to whether the RE is an ACK value. If the received RE is an ACK value, the method proceeds to block 912. If the received RE is not an ACK value, the method proceeds to block 914.

At block 912, ACK processing is performed as described in other sections of this document. The method then proceeds to block 938 (indicated by B).

At block 914, a determination is made as to whether the RE is a CSI1 value. If the received RE is a CSI1 value, the method proceeds to block 916. If the received RE is not a CSI1 value, the method proceeds to block 918.

At block 916, CSI1 processing is performed as described in other sections of this document. The method then proceeds to block 938 (indicated by B).

At block 918, the RE comprises data/CSI2 and therefore a request for a hypothesis value for the RE is generated. For example, the processor 516 outputs the request 318 to the RE identifier 232 to obtain a hypothesis index valued for the data/CSI2 information. In one embodiment, the response 320 generated by the RE identifier 232 indicates that the data/CSI2 information is data. In one embodiment, the response 320 generated by the RE identifier 232 indicates that the data/CSI2 information is CSI2 information associated with a selected hypothesis value (e.g., x).

At block 920, a determination is made as to whether the data/CSI2 information is data. If the response from the RE identifier 232 indicates that the data/CSI2 information is data, the method proceeds to block 922. If not, the method proceeds to block 924.

At block 922, the data is processed as described in other sections of this document. The method then proceeds to block 938 (indicated by B).

At block 924, a determination is made as to whether the hypothesis index associates with the CSI2 information is in the range of (2-10). If the hypothesis index is in the range of (2-10), the method proceeds to block 926. If not, the method proceeds to block 928 (indicated by A).

At block 926, the CSI2 information is accumulated with the appropriate CSI2 information in the memory 504 based on the hypothesis value, as described in other sections of this document. The method then proceeds to block 936 (indicated by B).

Referring now to FIG. 9B, at block 928, the current CSI2 information is identified to be associated with either hypothesis 0 or 1.

At block 930, the CSI2 RE is rescrambled using the received descrambling sequence. For example, the processor 516 uses the received descrambling sequence 246 to rescramble the received scrambled CSI2 RE 528 to generate a rescrambled CSI2 RE 536.

At block 932, the descrambling sequence 246 is modified to generate a modified descrambling sequence. The processor 516 performs a modifying function 534 to modify the received descrambling sequence 246 to generate the modified descrambling sequence 540.

At block 934, the rescrambled RE is descrambled with the modified descrambling sequence to generate a modified descrambled RE. For example, the processor 516 performs a descrambling function 542 to descramble the rescrambled CSI2 RE 536 to generate the modified descrambled CSI2 RE 544.

At block 936, the modified descrambled CSI2 RE 544 is accumulated with the appropriate hypothesis value in the memory 504.

At block 938, a determination is made as to whether there are more REs to combine in the current symbol. The processor 502 makes this determination from the RE information 236. If there are more REs to combine, the method proceeds to block 904 (indicated by C). If there are no more REs to combine, the method proceeds to block 940.

At block 940, the accumulated UCI values in the memory 504 are stored in the external memory 514.

At block 942, a determination is made as to whether there are more symbols having UCI information to be combined. If there are more symbols having UCI information to be combined (e.g., in the slot or subframe), the method proceeds to block 902 (indicated by D). In this path, the information stored in the external memory 514 is used to initialize the values stored in the memory 504 prior to combining information from additional symbols. If there are no more symbols to combine, the method ends.

Thus, the method 900 operates to provide combining in accordance with exemplary embodiments of a descrambling and combining system. It should be noted that the operations of the method 900 can be modified, added to, deleted, rearranged, or otherwise changed within the scope of the embodiments.

Figure 10A:
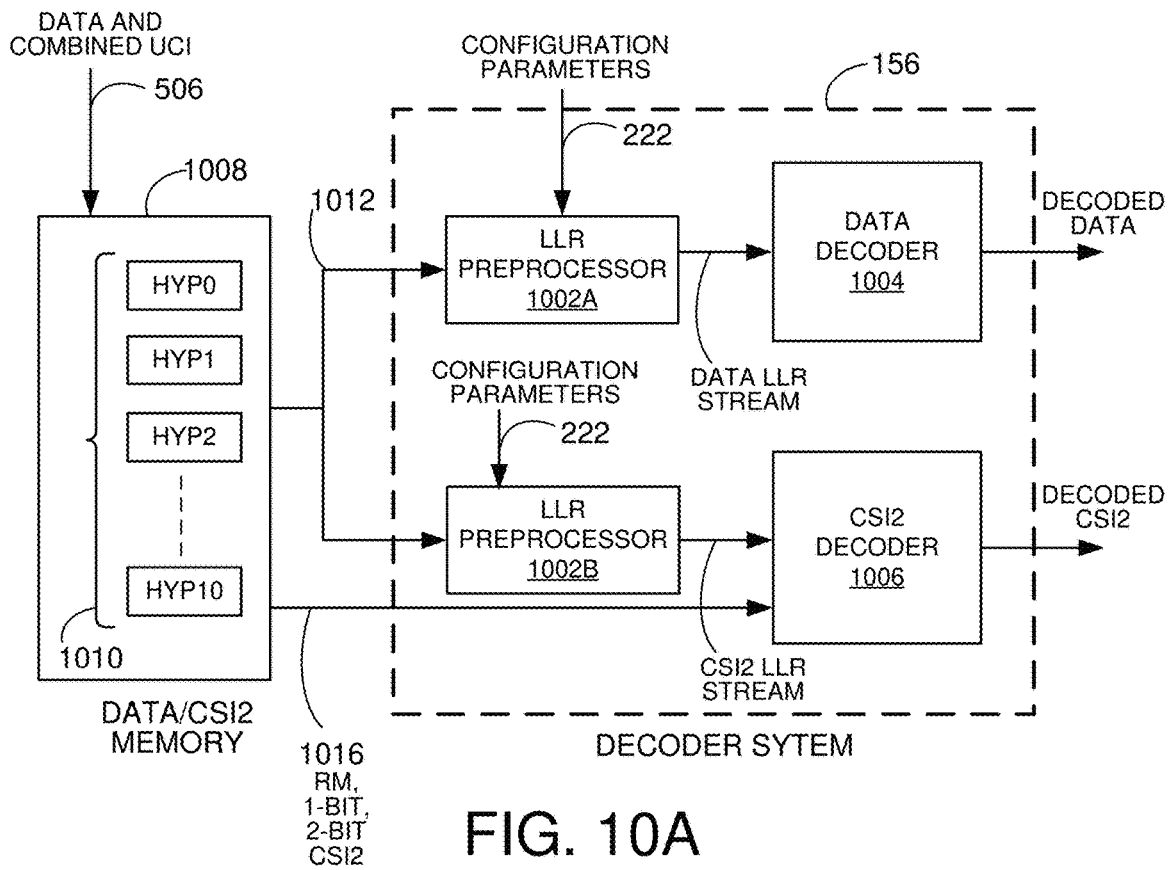
FIG. 10A shows an exemplary block diagram of a decoder system.

FIG. 10A shows an exemplary block diagram of the decoder system 156. In an embodiment, the decoder system 156 comprises an LLR preprocessors 1002A-B, data decoder 1004 and CSI2 decoder 1006. Also shown in FIG. 10 is memory 1008. In an embodiment, the memory 1008 receives the combined data and UCI information 506 from the combiner/extractor processor 502 shown in FIG. 5. For example, the memory 1008 receives combined hypothetical CSI2 values 1010 and outputs these values in an LLR stream 1012 to the decoder system 156.

In 5G or NR, data and UCI LLRs are multiplexed in both time and frequency. UCI is composed of CSI1/CSI2 and ACK fields. In an embodiment, CSI1 and ACK LLRs can be separated and/or removed from the LLR stream. However, the CSI2 LLRs cannot be separated before producing the composite output LLR stream 1012 provided as input to the decoder system 156. To extract the required LLRs from this composite stream, the LLR pre-processors 1002A-B perform this operation. For example, in one case, the preprocessor 1002A extracts the data LLRs from the stream 1012 and drops the remaining LLRs to form a data LLR stream. In another case, the preprocessor 1002B extracts the CSI2 LLRs and drops the remaining LLRs to form a CSI2 LLR stream.

In an embodiment, the data decoder 1004 decodes the data LLR stream to generate decoded data. The CSI2 decoder 1006 decodes the CSI2 LLR stream to generate decoded CSI2 information. In another embodiment, Reed Muller (RM), 1-bit, or 2-bit encoded CSI2 LLRs (indicated at 1016) are provided directly to the CSI2 decoder 1006.

Figure 10B:
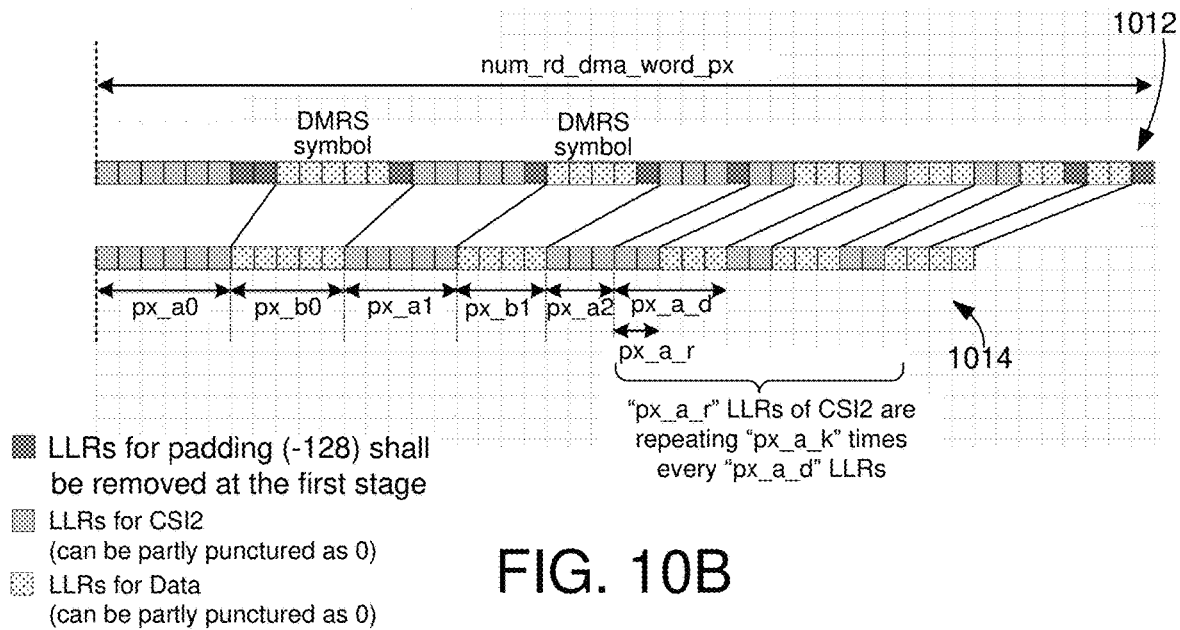
FIG. 10B shows an exemplary detailed diagram illustrating an embodiment of an LLR stream that is input to the decoder system shown in FIG. 10A.

FIG. 10B shows an exemplary detailed diagram illustrating an embodiment of the LLR stream 1012 that is input to the decoder system 156 in accordance with one embodiment of the present invention. The LLR stream 1012 includes LLRs for CSI2, LLRs for data, and padding LLRs, which are represented by px_b0 and p1_b1, respectively. Following these CSI2 and data bursts, there can be periodic and alternating CSI2 and data LLRs repeating "a_k" times. Each period starts with CSI2 of length "px_a_r" LLRs followed by data of length "px_a_d−px_a_r" LLRs. Following this periodic pattern, the rest will be data LLRs until the end of 'num_rd_dma_word_px'. Overall, these bursts are repeated twice. For example, px becomes p0 for part 0 and p1 for part 1.

Configuration

In an embodiment, the following configuration parameters 222 shown in Table 4 below are used for the operation of the LLR preprocessors 1002A-B to separate the data and CSI2 LLRs. These parameters will be present in the AB_CFG section of LDPC decoder (LDEC) and polar decoder (PDEC) blocks of the configuration parameters 222. It is not necessary for all these parameters to show up in the same 64-bit word or in consecutive words.

TABLE 4

Configuration parameters

| | Parameter | Width | Description |
|---|---|---|---|
| 1 | preproc_mode | 1 | '0': Pass CSI2 LLRs and drop rest<br>'1': Pass data LLRs and drop rest |
| 2 | preproc_p0_csi2_len0 | 19 | CSI2 part 0-burst 0 size. Range: [0:422399] |
| 3 | preproc_p0_csi2_len1 | 19 | CSI2 part 0-burst 1 size. Range: [0:422399] |
| 4 | preproc_p0_csi2_len2 | 19 | CSI2 part 0-burst 2 size. Range: [0:422399] |
| 5 | preproc_p1_csi2_len0 | 19 | CSI2 part 1-burst 0 size. Range: [0:422399] |
| 6 | preproc_p1_csi2_len1 | 19 | CSI2 part 1-burst 1 size. Range: [0:422399] |
| 7 | preproc_p1_csi2_len2 | 19 | CSI2 part 1-burst 2 size. Range: [0:422399] |
| 8 | preproc_p0_data_len0 | 17 | Data part 0-burst 0 size. Range: [0:105599] |
| 9 | preproc_p0_data_len1 | 17 | Data part 0-burst 1 size. Range: [0:105599] |
| 10 | preproc_p1_data_len0 | 17 | Data part 0-burst 0 size. Range: [0:105599] |
| 11 | preproc_p1_data_len1 | 17 | Data part 0-burst 1 size. Range: [0:105599] |
| 12 | preproc_p0_csi2_repeat_period | 16 | Periodicity of Repeated CSI2 LLRs followed by part 0 (3 bursts of CSI2 and 2 bursts of data) LLRs. Represents number of LLRs of each period. Range: [0:52800] |
| 13 | preproc_p1_csi2_repeat_period | 16 | Periodicity of Repeated CSI2 LLRs followed by part 1 (3 bursts of CSI2 and 2 bursts of data) LLRs. Represents number of LLRs of each period. Range: [0:52800] |
| 14 | preproc_csi2_repeat_burst_size | 6 | Burst size of CSI2 LLRs in each repeat of both part 0 and part 1. Range: {1, 2, 3, 4, 6, 8, 10, 12, 16, 18, 20, 24, 30, 32, 40} |
| 15 | preproc_p0_num_repeat | 11 | Number of periodic repetitions in part 0. Range: [0:2047] |
| 16 | preproc_p1_num_repeat | 11 | Number of periodic repetitions in part 1. Range: [0:2047] |
| 17 | num_rd_dma_words_p0 | 32 | Number of read DMA words for part 0 |
| 18 | num_rd_dma_words_p1 | 32 | Number of read DMA words for part 1 |
| 19 | tb_tx_bit_size | 24 | Number of LLRs to be sent to the decoder core | identified in FIG. 10B by their respective shading. In an embodiment, the LLR preprocessors 1002A-B perform an algorithm to remove the padding LLRs to generate a second stream 1014 that contains LLRs for data and CSI2. For example, after the padding LLRs are dropped by the preprocessors 1002A-B, the remaining LLR stream follows a pattern as shown in the stream 1014.

In an embodiment, there can be up to 3 bursts of CSI2 LLRs and up to 2 bursts of data LLRs alternating with each other in each half slot. Each burst of data LLRs corresponds to a set of data LLRs in a DMRS symbol. In the frequency hopping case, there can be up to 2 DMRS symbols in each half slot and hence two bursts of data LLRs are possible. Each burst of CSI2 LLRs corresponds to a consecutive group of CSI2 LLRs not interrupted by data LLRs.

The burst sizes of CSI2 LLRs are represented by px_a0, px_a1, and px_a2. And the burst sizes of data LLRs are LLR Preprocessor Operation In an exemplary embodiment, the following pseudo-code describes the operation of the LLR pre-processors 1002A-B of the decoding system to separate data and CSI2 LLRs to the appropriate decoder. For example, the pseudo-code below utilizes configuration parameters shown in Table 4 to remove padding (e.g., "tagged") LLRs and separate data and CSI2 LLR from an input stream to generate data and CSI2 streams that are passed to the appropriate decoder.

```
If (preproc_mode==0)
    target='csi2'
else
    target='data'
end
csi2_count='preproc_p0_csi2_len0'
data_count='preproc_P0_data_len0'
```

Step 0:
  Drop all tagged LLRs.
Step 1: part 0 starts
  Read 'csi2_count' csi2 LLRs.
  If target=='csi2'
  pass LLRs to CSI2 decoder
  else
  drop them (remove from stream)
  end
Step 2:
  Read 'data_count' data LLRs.
  If target=='csi2'
  drop them
  else
  pass remaining to data decoder
  end
Step 3:
  Repeat steps 1 and 2 one more time with csi2_count='preproc_p0_csi2_len1' and data count='preproc_p0_data_len1'
Step 4:
  Read 'preproc_p0_csi2_len2' csi2 LLRs.
  If target=='csi2'
  pass them to CSI2 decoder
  else
  drop them
  end
Step 5:
  Read 'preproc_csi2_repeat_burst_size' CSI2 LLRS
  If target=='csi2'
  pass them to CSI2 decoder
  else
  drop them
  end
Step 6:
  Read 'preproc_p0_csi2_repeat_period–preproc_p0_csi2_repeat_burst_size' data LLRS
  If target=='csi2'
  drop them
  else
  pass them to data decoder
  end
Step 7:
  Repeat steps 5 and 6 'preproc_p0_num_repeat' times
Step 8: part 0 ends
  Continue reading rest of data LLRs till 'num_rd_dma_words_p0' are read
  If target=='csi2'
  drop them
  else if (num_rd_data_llrs<'tb_tx_bit_size')
  // Number of data LLRs read so far pass them to decoder
  else
  drop them.
Step 9: part 1 starts
  Repeats Step 1 to Step 7 by replacing all 'p0' with 'p1'.
Step 10: part 1 ends
  Continue reading rest of data LLRs till 'num_rd_dma_words_p0+num_rd_dma_words_p1' are read
  If target=='csi2'
  drop them
  else
  if (num_rd_data_llrs<'tb_tx_bit_size')
  // Number of data LLRs read so far pass them to decoder
  else
  drop them.

Figure 11:
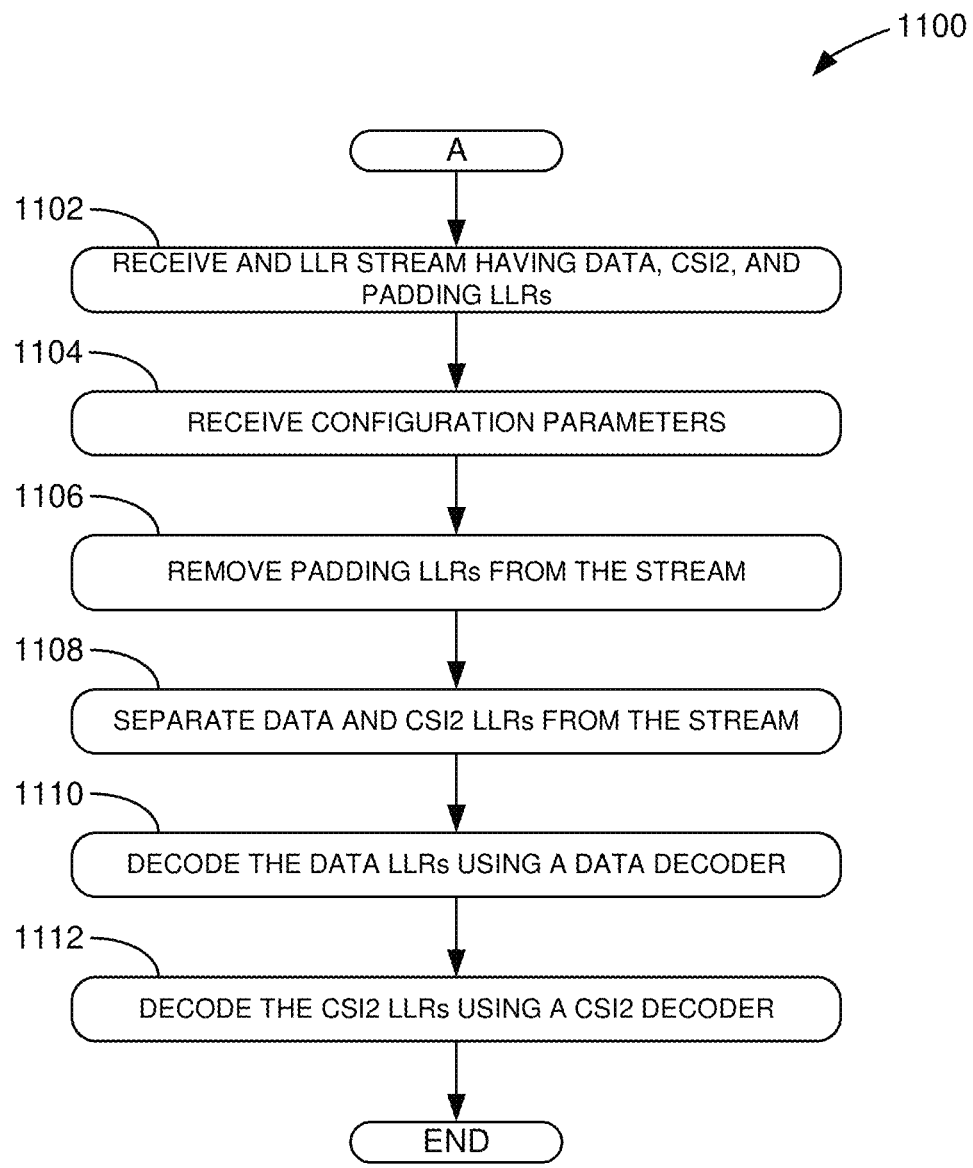
FIG. 11 shows an exemplary method for performing decoding in accordance with exemplary embodiments of a decoder system.

FIG. 11 shows an exemplary method 1100 for performing decoding in accordance with exemplary embodiments of a decoder system. For example, the method 1100 is suitable for use with the decoder system 156 shown in FIG. 2.

At block 1102, a stream of data, CSI2, and padding LLRs are received. For example, in an embodiment, the stream 1012 is received from the memory 1008 by the decoder 156. In an embodiment, both LLR pre-processors 1002A-B receive the stream.

At block 1104, configuration parameters are received. In an embodiment, the configuration parameters 222 are received by the pre-processors 1002A-B.

At block 1106, the padding LLRs are removed from the stream. For example, the pre-processors 1002A-B remove the padding ("tagged") LLRs from the stream they have received.

At block 1108, data and CSI2 LLRs are separated. For example, the pre-processors 1102A-B separate the data and CSI2 LLRs based on the received configuration parameters. For example, each of the LLR preprocessors 1102A-B performs the algorithm above to separate either data or CSI2 LLRs from the stream they have received.

At block 1110, the data LLRs are decoded. For example, the data decoder 1004 receives and decodes the data LLRs.

At block 1112, the CSI2 LLRs are decoded. For example, the CSI2 decoder 1006 receives and decodes the CSI2 LLRs.

Thus, the method 1100 operates to provide decoding in accordance with exemplary embodiments. It should be noted that the operations of the method 1100 can be modified, added to, deleted, rearranged, or otherwise changed within the scope of the embodiments.

Figure 12:
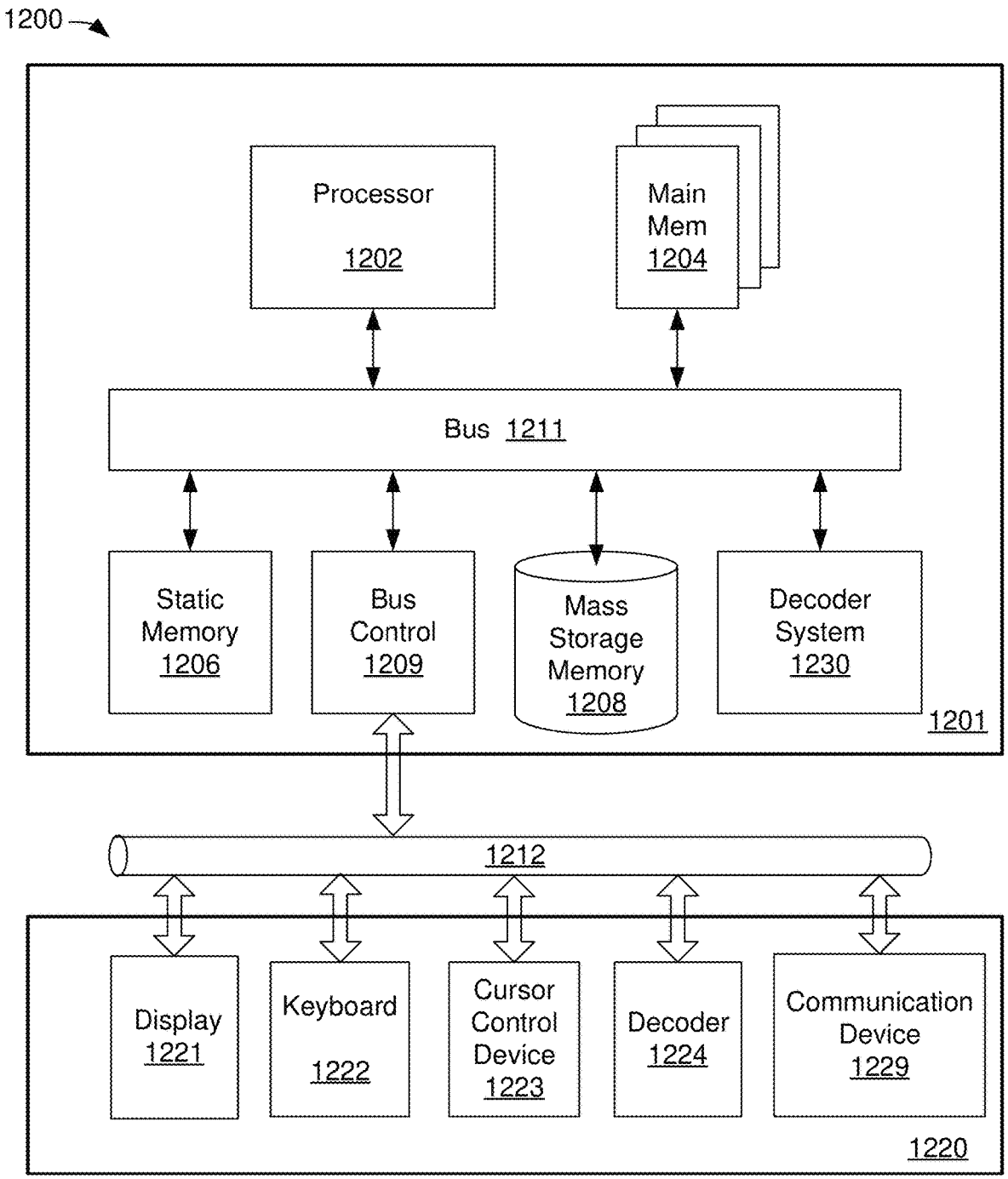
FIG. 12 shows a block diagram illustrating a processing system having an exemplary embodiment of a decoder.

FIG. 12 shows a block diagram illustrating a processing system 1200 having an exemplary embodiment of a decoder system 1230. For example, the decoder system 1230 is suitable for use as the decoder system 156 shown in FIG. 2. It will be apparent to those of ordinary skill in the art that other alternative computer system architectures may also be employed.

The system 1200 includes a processing unit 1201, an interface bus 1212, and an input/output ("IO") unit 1220. Processing unit 1201 includes a processor 1202, main memory 1204, system bus 1211, static memory device 1206, bus control unit 1209, mass storage memory 1208, and the decoder system 1230. Bus 1211 is used to transmit information between various components and processor 1202 for data processing. Processor 1202 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 1204, which may include multiple levels of cache memories, stores frequently used data and instructions. Main memory 1204 may be RAM (random access memory), MRAM (magnetic RAM), or flash memory. Static memory 1206 may be a ROM (read-only memory), which is coupled to bus 1211, for storing static information and/or instructions. Bus control unit 1209 is coupled to buses 1211-1212 and controls which component, such as main memory 1204 or processor 1202, can use the bus. Mass storage memory 1208 may be a magnetic disk, solid-state drive ("SSD"), optical disk, hard disk drive, floppy disk, CD-ROM, and/or flash memories for storing large amounts of data.

I/O unit 1220, in one example, includes a display 1221, keyboard 1222, cursor control device 1223, decoder 1224, and communication device 1229. Display device 1221 may be a liquid crystal device, flat panel monitor, cathode ray tube ("CRT"), touch-screen display, or other suitable display device. Display 1221 projects or displays graphical images or windows. Keyboard 1222 can be a conventional alphanumeric input device for communicating information between computer system 1200 and computer operators. Another type of user input device is cursor control device 1223, such as a mouse, touch mouse, trackball, or other type of cursor for communicating information between system 1200 and users.

Communication device 1229 is coupled to bus 1212 for accessing information from remote computers or servers through wide-area network. Communication device 1229 may include a modem, a router, or a network interface device, or other similar devices that facilitate communication between computer 1200 and the network. In one aspect, communication device 1229 is configured to perform wireless functions. Alternatively, decoder system 1230 and communication device 1229 perform resource element categorization, descrambling and combining functions in accordance with one embodiment of the present invention.

The decoder system 1230, in one aspect, is coupled to bus 1211 and is configured to perform decoding functions on received uplink communications as described above to improve overall receiver performance. In an embodiment, the decoder system 1230 comprises hardware, firmware, or a combination of hardware and firmware.

While particular embodiments of the present invention have been shown and described, it will be obvious to those skilled in the art that, based upon the teachings herein, changes and modifications may be made without departing from the exemplary embodiments of the present invention and its broader aspects. Therefore, the appended claims are intended to encompass within their scope all such changes and modifications as are within the true spirit and scope of this exemplary embodiments of the present invention.

What is claimed is:

1. A method for processing information transmitted via a communication network, comprising:
   receiving a stream of resource elements ("REs") transmitted via an uplink transmission from a user equipment ("UE");
   obtaining a log-likelihood ratios ("LLR") stream containing at least one data LLR and one uplink control information ("UCI") LLR based on the stream of REs;
   extracting one or more data LLRs from the LLR stream to form a data LLR stream; and
   generating decoded data by a data decoder in response to the data LLR stream.

2. The method of claim 1, further comprising extracting one or more UCI LLRs from the LLR stream to form a UCI LLR stream.

3. The method of claim 2, further comprising generating decoded UCI by a UCI decoder in response to the UCI LLR stream.

4. The method of claim 2, wherein extracting one or more UCI LLRs includes extracting a second channel state information ("CSI2") LLR from the UCI LLR stream.

5. The method of claim 4, wherein extracting CSI2 LLR includes decoding the CSI2 stream via a CSI2 decoder.

6. The method of claim 3, wherein generating decoded UCI includes decoding the UCI LLR stream to generate decoded second channel state information ("CSI2").

7. The method of claim 1, wherein receiving a stream of REs includes deriving the stream of REs from symbols transmitted via a new radio ("NR") uplink transmission.

8. The method of claim 1, further comprising removing padding LLRs from the LLR stream.

9. The method of claim 8, wherein removing padding LLRs includes extracting the padding LLRs prior to extracting the data LLR.

10. The method of claim 1, further comprising outputting the decoded data and decoded CSI2 information.

11. The method of claim 1, wherein extracting one or more data LLR includes separating the data LLRs into the data stream via a first LLR preprocessor.

12. The method of claim 2, wherein extracting one or more UCI LLR includes separating a second channel state information ("CSI2") LLR from a CSI2 stream via a second LLR preprocessor.

13. The method of claim 1, wherein generating decoded data includes decoding the data LLR stream in accordance with a configuration parameter.

14. A device able to processing network information via a wireless communication network, comprising:
   a memory configured to store a stream of resource elements ("REs") containing data and uplink control information ("UCI") generated by a combiner and extractor block;
   a first preprocessor coupled to the memory and configured to generate a data log-likelihood ratios ("LLR") stream via extracting data LLRs from the stream of REs;
   a second preprocessor coupled to the memory and configured to generate a UCI LLR stream via extracting UCI LLRs from the stream of REs; and
   a data decoder coupled to the first preprocessor and configured to generate decoded data in response to the data LLR stream.

15. The device of claim 14, further comprising a UCI decoder coupled to the second preprocessor and configured to generate decoded UCI in response to the UCI LLR stream.

16. The device of claim 15, wherein the UCI decoder is a second channel state information ("CSI2") decoder configured to decode CSI2 LLR stream.

17. The device of claim 14, wherein the stream of REs includes second channel state information ("CSI2") LLRs.

18. The device of claim 17, wherein the second preprocessor is operable to generate a CSI2 LLR stream via extracting one or more CSI2 LLRs from the stream of REs.

19. The device of claim 17, wherein the stream of REs is generated via symbols transmitted from a new radio (NR) uplink transmission.

20. The device of claim 14, wherein the first and second preprocessors remove padding LLRs from the stream of REs.

21. A method for processing information transmitted via a communication network, comprising:
   receiving a stream of resource elements ("REs") transmitted via an uplink transmission from a user equipment ("UE");
   obtaining a log-likelihood ratios ("LLR") stream containing at least one data LLR and one uplink control information ("UCI") LLR based on the stream of REs;
   extracting one or more UCI LLRs from the LLR stream to form a UCI LLR stream; and
   generating decoded UCI by a UCI decoder in response to the UCI LLR stream.

22. The method of claim 21, further comprising extracting one or more data LLRs from the LLR stream to form a data LLR stream.

23. The method of claim 22, further comprising generating decoded data by a data decoder in response to the data LLR stream.

24. The method of claim 21, wherein extracting one or more UCI LLRs includes extracting a second channel state information ("CSI2") LLR from the UCI LLR stream.

25. The method of claim 24, wherein extracting CSI2 LLR includes decoding the CSI2 stream via a CSI2 decoder.

26. The method of claim 21, wherein generating decoded UCI includes decoding the UCI LLR stream to generate decoded second channel state information ("CSI2").

27. An apparatus for processing network information transmitted via a communication network, comprising:
   means for receiving a stream of resource elements ("REs") transmitted via an uplink transmission from a user equipment ("UE");
   means for obtaining a log-likelihood ratios ("LLR") stream containing at least one data LLR and one uplink control information ("UCI") LLR based on the stream of REs;
   means for extracting one or more data LLRs from the LLR stream to form a data LLR stream; and
   means for generating decoded data by a data decoder in response to the data LLR stream.

28. The apparatus of claim 27, further comprising means for extracting one or more UCI LLRs from the LLR stream to form a UCI LLR stream.

29. The apparatus of claim 28, further comprising means for generating decoded UCI by a UCI decoder in response to the UCI LLR stream.

30. The apparatus of claim 27, wherein means for extracting one or more UCI LLRs includes means for extracting a second channel state information ("CSI2") LLR from the UCI LLR stream.

31. The apparatus of claim 30, wherein means for extracting CSI2 LLR includes means for decoding the CSI2 stream via a CSI2 decoder.

32. The apparatus of claim 29, wherein means for generating decoded UCI includes means for decoding the UCI LLR stream to generate decoded second channel state information ("CSI2").

33. The apparatus of claim 27, wherein means for receiving a stream of REs includes means for deriving the stream of REs from symbols transmitted via a new radio ("NW") uplink transmission.

34. The apparatus of claim 27, further comprising means for removing padding LLRs from the LLR stream.

35. The apparatus of claim 34, wherein means for removing padding LLRs includes means for extracting the padding LLRs prior to extracting the data LLR.

* * * * *